United States Patent
Harutyunyan

(10) Patent No.: US 11,352,258 B2
(45) Date of Patent: Jun. 7, 2022

(54) MULTIFUNCTIONAL CONDUCTIVE WIRE AND METHOD OF MAKING

(71) Applicant: Honda Motor Co., Ltd., Tokyo (JP)

(72) Inventor: Avetik Harutyunyan, Columbus, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 82 days.

(21) Appl. No.: 16/805,565

(22) Filed: Feb. 28, 2020

(65) Prior Publication Data

US 2020/0283295 A1 Sep. 10, 2020

Related U.S. Application Data

(63) Continuation-in-part of application No. 16/446,389, filed on Jun. 19, 2019.

(60) Provisional application No. 62/813,516, filed on Mar. 4, 2019.

(51) Int. Cl.
| | |
|---|---|
| *C01B 32/16* | (2017.01) |
| *D02G 3/02* | (2006.01) |
| *C01B 32/168* | (2017.01) |
| *D01F 9/12* | (2006.01) |

(Continued)

(52) U.S. Cl.
CPC ............ *C01B 32/16* (2017.08); *C01B 32/168* (2017.08); *D01F 9/12* (2013.01); *D02G 3/02* (2013.01); *B82Y 30/00* (2013.01); *B82Y 40/00* (2013.01)

(58) Field of Classification Search
CPC ........ C01B 32/16; C01B 32/168; D02G 3/02; D02G 3/16; D02G 3/441; D01F 9/12; D01F 9/127; D01F 9/133; B82Y 40/00; B82Y 30/00; D10B 2101/122
See application file for complete search history.

(56) References Cited

U.S. PATENT DOCUMENTS

| | | |
|---|---|---|
| 3,513,034 A | 5/1970 | Fischbach et al. |
| 3,772,084 A | 11/1973 | Scholle |
| 5,985,175 A | 11/1999 | Fan et al. |

(Continued)

FOREIGN PATENT DOCUMENTS

| | | |
|---|---|---|
| CN | 102482698 A | 5/2012 |
| CN | 102593436 A | 7/2012 |

(Continued)

OTHER PUBLICATIONS

The Swatch Group Ltd., A revolutionary battery by Belenos: The Watchmaker Swatch Group Has Signed An Agreement With The Chinese Geely Group For Use Of Its Innovative New Battery., as accessed on May 29, 2019, 3 Pages, hereinafter "Swatch" (URL listed separately) (Year: 2019).*

(Continued)

*Primary Examiner* — Daniel C. McCracken
(74) *Attorney, Agent, or Firm* — Arent Fox LLP; Mark Duell

(57) ABSTRACT

The present disclosure is directed to multifunctional conductive wire and methods of making multifunctional conductive wire. According to some aspects, the multifunctional conductive wire disclosed herein can function as a current carrier and as a battery, either for providing or storing power. The multifunctional conductive wires disclosed herein can eliminate the need for heavy metal conductors in various devices while improving power efficiency.

20 Claims, 12 Drawing Sheets

(51) Int. Cl.
   *B82Y 40/00* (2011.01)
   *B82Y 30/00* (2011.01)

(56) References Cited

U.S. PATENT DOCUMENTS

| | | |
|---|---|---|
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga et al. |
| 9,450,266 B2 | 9/2016 | Hosaka et al. |
| 9,502,734 B1 | 11/2016 | Lim et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,859,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,096,803 B2 | 10/2018 | Iseri et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,658,651 B2 | 5/2020 | Pierce et al. |
| 10,957,939 B2 | 3/2021 | Zhi et al. |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0148887 A1 | 7/2005 | Reiter et al. |
| 2005/0209392 A1 | 9/2005 | Luo et al. |
| 2005/0221185 A1 | 10/2005 | Sakata et al. |
| 2006/0038949 A1 | 2/2006 | Okabe et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0040229 A1 | 2/2008 | Gholston |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Sakakibara et al. |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1 | 6/2010 | Wang et al. |
| 2010/0178543 A1 | 7/2010 | Gruner et al. |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0060162 A1 | 3/2011 | Tatsuhara et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0157046 A1 | 6/2011 | Lee et al. |
| 2011/0158892 A1 | 6/2011 | Yamaki |
| 2011/0171398 A1 | 7/2011 | Oladeji |
| 2011/0173198 A1 | 7/2011 | Malleshaiah et al. |
| 2011/0177393 A1 | 7/2011 | Park et al. |
| 2011/0311874 A1 | 12/2011 | Zhou et al. |
| 2012/0105370 A1 | 5/2012 | Kim et al. |
| 2012/0107683 A1 | 5/2012 | Kim et al. |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hooke et al. |
| 2012/0177934 A1 | 7/2012 | Vogel et al. |
| 2012/0193602 A1 | 8/2012 | Lieber et al. |
| 2012/0219490 A1 | 8/2012 | Noda et al. |
| 2012/0241666 A1 | 9/2012 | Hong et al. |
| 2012/0282522 A1 | 11/2012 | Axelbaum et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065125 A1 | 3/2013 | Sawaki et al. |
| 2013/0065130 A1 | 3/2013 | Ban et al. |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0189565 A1 | 7/2013 | Lashmore et al. |
| 2013/0224551 A1 | 8/2013 | Hiralal et al. |
| 2013/0256011 A1 | 10/2013 | Chang et al. |
| 2013/0323583 A1 | 12/2013 | Phares |
| 2014/0013588 A1 | 1/2014 | Wang et al. |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0141248 A1 | 5/2014 | Noyes |
| 2014/0170490 A1 | 6/2014 | Izuhara et al. |
| 2014/0255782 A1 | 9/2014 | Jabbour et al. |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin |
| 2015/0340741 A1 | 11/2015 | Kim et al. |
| 2015/0349325 A1 | 12/2015 | Chen et al. |
| 2015/0364750 A1 | 12/2015 | Maheshwari et al. |
| 2015/0380738 A1 | 12/2015 | Zhou et al. |
| 2016/0009557 A1 | 1/2016 | Harutyunyan et al. |

(56) References Cited

U.S. PATENT DOCUMENTS

| | | |
|---|---|---|
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0094079 A1 | 3/2016 | Hiroki et al. |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A2 | 3/2018 | Choi et al. |
| 2018/0115026 A1 | 4/2018 | Mairs |
| 2018/0240609 A1* | 8/2018 | Park ................. H01G 11/54 |
| 2018/0241081 A1 | 8/2018 | Deng et al. |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2020/0264663 A1 | 8/2020 | Kumta et al. |
| 2021/0399289 A1 | 12/2021 | Eshraghi et al. |

FOREIGN PATENT DOCUMENTS

| | | | |
|---|---|---|---|
| CN | 102674316 A | 9/2012 | |
| CN | 102674316 B | 9/2012 | |
| CN | 204072059 U | 1/2015 | |
| CN | 104752651 A | 7/2015 | |
| CN | 103219467 B | 11/2015 | |
| CN | 103715394 B | 1/2016 | |
| CN | 205375473 U | 7/2016 | |
| CN | 103280846 B | 8/2016 | |
| CN | 106024969 A | 10/2016 | |
| CN | 205697720 U | 11/2016 | |
| CN | 104392845 B | 3/2017 | |
| CN | 104362326 B | 8/2017 | |
| CN | 107086306 A | 8/2017 | |
| CN | 107611340 A | 1/2018 | |
| CN | 108878717 A | 11/2018 | |
| CN | 109088071 A | 12/2018 | |
| CN | 208690415 U | 4/2019 | |
| CN | 106129536 B | 7/2019 | |
| DE | 102017123752 B3 | 3/2019 | |
| EP | 2 213 369 A1 | 8/2010 | |
| EP | 2213369 A1 | 8/2010 | |
| EP | 2 476 648 A1 | 7/2012 | |
| EP | 2 835 177 A1 | 2/2015 | |
| EP | 2835177 A1 | 2/2015 | |
| JP | 6-267515 A | 9/1994 | |
| JP | 11-31502 A | 2/1999 | |
| JP | 2005-272277 A | 10/2005 | |
| JP | 2007-49789 A | 2/2007 | |
| JP | 2010-277925 A | 12/2010 | |
| JP | 2015105208 A | 6/2015 | |
| JP | 2015-521347 A | 7/2015 | |
| JP | 2015-220004 A | 12/2015 | |
| JP | 2016-25077 A | 2/2016 | |
| JP | 2016-31922 A | 3/2016 | |
| JP | 2016-54113 A | 4/2016 | |
| JP | 2016-73196 A | 5/2016 | |
| JP | 2017-130274 A | 7/2017 | |
| JP | 2017-147222 A | 8/2017 | |
| JP | 2017-162637 A | 9/2017 | |
| KR | 10-2007-0001220 A | 1/2007 | |
| KR | 10-1548465 B1 | 8/2015 | |
| KR | 10-2016-0047643 A | 5/2016 | |
| KR | 10-1632109 B1 | 6/2016 | |
| KR | 20160114389 A | 10/2016 | |
| KR | 10-2016-0127641 A | 11/2016 | |
| KR | 10-2016-0129440 A | 11/2016 | |
| KR | 10-2016-0129500 A | 11/2016 | |
| KR | 10-1676641 B1 | 11/2016 | |
| KR | 10-1703516 B1 | 2/2017 | |
| KR | 10-2017-0036478 A | 4/2017 | |
| KR | 10-2017-0037510 A | 4/2017 | |
| KR | 10-1729702 B1 | 4/2017 | |
| KR | 10-1765459 B1 | 8/2017 | |
| KR | 10-1795544 B1 | 11/2017 | |
| KR | 10-2019-0040554 A | 4/2019 | |
| WO | WO 2005/052053 A1 | 6/2005 | |
| WO | WO 2055/052053 A1 | 6/2005 | |
| WO | WO 2005/096089 A1 | 10/2005 | |
| WO | WO 2011/030821 A1 | 3/2011 | |
| WO | WO 2012/156297 A2 | 11/2012 | |
| WO | WO 2014/102131 A2 | 7/2014 | |
| WO | WO 2014/153465 A1 | 9/2014 | |
| WO | WO 2015/100762 A1 | 7/2015 | |
| WO | WO 2017/052248 A1 | 3/2017 | |
| WO | WO 2017/120391 A1 | 7/2017 | |
| WO | WO 2017/131451 A1 | 8/2017 | |
| WO | WO 2018/110933 A1 | 6/2018 | |
| WO | WO 2018/194414 A1 | 10/2018 | |
| WO | WO 2018/194415 A1 | 10/2018 | |
| WO | WO 2019/027147 A1 | 2/2019 | |

OTHER PUBLICATIONS

"Swatch" URL: https://www.swatchgroup.com/en/swatch-group/innovation-powerhouse/industry-40/revolutionary-battery-belenos (Year: 2019).*

Jung, Sungmook, et al., "Wearable Fall Detector using Integrated Sensors and Energy Devices", Scientific Reports, pp. 1-9, Nov. 24, 2015.

Office Action issued by the Korean Patent Office in related Korean Patent Application No. 10-2020-0005929, dated Jul. 27, 2021.

Ostfeld, Aminy E., et al., "High-performance flexible energy storage and harvesting system for wearable electronics", Scientific Reports, pp. 1-10, May 17, 2016.

Communication dated Aug. 26, 2019, from the European Patent Office in related European Application No. 18186402.6.

International Search Report and the Written Opinion issued by the International Searching Authority corresponding to PCT/US20/43017, dated Dec. 14, 2020.

International Search Report and Written Opinion, issued by International Searching Authority in related International Application No. PCT/US2020/039821, dated Sep. 30, 2020.

Notice of Reasons for Rejection issued by the Japanese Patent Office corresponding to Japanese Application No. 2017-048275, dated Dec. 1, 2020.

Notice of Reasons for Rejection issued by the Japanese Patent Office corresponding to Japanese Patent Application No. 2017-048276, dated Dec. 1, 2020.

Notice of Reasons for Rejection issued by the Japanese Patent Office corresponding to Japanese Patent Applivation No. 2020-002026, dated Dec. 22, 2020.

(56) References Cited

OTHER PUBLICATIONS

Schiller, David. "Development of a Stretchable Battery Pack for Wearable Applications." submitted by David Schiller, BSc. Diss. Universit't Linz, Nov. 2019, p. 19-37 [online] <https://epub.jku.at/obvulihs/content/titleinfo/4605900/full.pdf>.
Office Action issued by Chinese Patent Office in related Chinese Patent Application No. 201710151455.7, dated Jul. 16, 2021.
Communication issued by the International Searching Authority in corresponding International Application No. PCT/US19/49923 dated Nov. 13, 2019.
Kun Kelvin Fu et al., "Flexible Batteries: From Mechanics to Devices", 2016 American Chemical Society, ACS Publications, ACS Energy Letters 1, pp. 1065-1079, (2016).
Sau Yen Chew et al., "Flexible free-standing carbon nanotube films for model lithium-ion batteries", Carbon 47, pp. 2976-2983, (2009).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A.J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Supported Co—Fe Catalysts for Carbon Nanotube Synthesis in Fluidized Bed Reactors" Particle Technology and Fluidization, vol. 54, No. 3, pp. 657-664, Mar. 2008.
Communication dated Jul. 31, 2019, from the European Patent Office in counterpart European Application No. 18194454.7.
Danafar et. al., "Fluidized bed catalytic chemical vapor deposition synthesis of carbon nanotubes—A review," the Chemical Engineering Journal, vol. 155, pp. 37-48, 2009.
Dunens, O., et. al., "Synthesis of Multiwalled Carbon Nanotubes on Fly Ash Derived Catalysts," Environ. Sci. Technol., vol. 43, pp. 7889-7894, 2009.
Extended European Search Report issued in corresponding European Application No. 18184002.6 dated Nov. 30, 2018.
Extended European Search Report issued in corresponding European Patent Application No. 18173644.8 dated Oct. 12, 2018.
Extended European Search Report issued in corresponding European Patent Application No. 18186402.6 dated Oct. 11, 2018.
Extended European Search Report issued in corresponding European Patent Application No. 18194469.5 dated Dec. 4, 2018.
Extended European Search Report of related European Patent Application No. 18184002.6, dated Nov. 30, 2018.
Extended Search Report of related EP Application No. 18 19 4454 dated Jul. 23, 2019.
Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.

Howard Wang, "Dispersing Carbon Nanotubes Usuing Surfactants" Current Opinion in Colloid & Interface Science 14, pp. 364-371, 2009.
Hu, Liangbing et al., Thin, Flexible Secondary Li-Ion Paper Batteries, ACS Nano, vol. 4, No. 10, pp. 5843-5848, 2010.
International Search Report and Written Opinion issued by the International Search Authority in corresponding International Application No. PCT/US19/49923, dated Jan. 23, 2020.
Jenax Inc., Flexible Lithium Polymer Battery J . Flex, Copyright 2014, 6 Pages.
Joo-Seong Kim et al., Supporting Information, A Half Millimeter Thick Coplanar Flexible Battery with Wireless Recharging Capability, Nano Letters 2015 15 (4), 9 Pages Total, (2015).
Linqin Jiang et al., "Production of Aqueous Colloidal Dispersions of Carbon Nanotubes", Journal of Colloid and Interface Science, pp. 89-94, 2003.
Liu et al.; "Carbon nanotube (CNT)-based composites as electrode material for rechargeable Li-ion batteries: A review"; Composite Science and Technology, vol. 72, Issue 2 (Jan. 18, 2012); pp. 121-144. (Year:2012).
Luo Shu et al., "Binder-Free LiCoO2/Carbon Nanotube Cathodes for High-Performance Lithium Ion Batteries" Advanced Materials, vol. 24, pp. 2294-2298, 2012.
Nanalyze., A Flexible Battery from Blue Spark Technologies, Apr. 8, 2014, 4 Pages.
O.M. Marago, et al, "Optical trapping of carbon nanotubes", Physica E, 40 (2008), pp. 2347-2351.
Office Action issued by the European Patent Office in corresponding European Patent Application No. 18184002.6, dated May 13, 2020.
Panasonic Corp., Panasonic Develops Bendable, Twistable, Flexible Lithium-ion Battery, Sep. 29, 2016, 8 Pages.
ProLogium Technology Co., Ltd., FLCB Flexible Type LCB, Copyright 2015, 6 Pages.
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sebastian Anthony, LG produces the first flexible cable-type lithium-ion battery, ExtremeTech, Aug. 30, 2012, 9 Pages.
The Extended European Search Report issued in corresponding European Patent Application No. 18186402.6 dated Oct. 11, 2018.
Vishwam Sankaran., Samsung is reportedly developing a curved battery for its foldable phone, Jul. 4, 2018, 4 Pages.
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).
Zhao, M.Q. et. al., "Towards high purity graphene/single-walled carbon nanotube hybrids with improved electrochemical capacitive performance," Carbon, vol. 54, pp. 403-411, 2013.
Notice of Reasons for Rejection issued by the Japanese Patent Office related to Japanese Patent Application No. 2020-002545, dated Aug. 17, 2021.
International Search Report issued by the International Searching Authority in corresponding International Patent Application No. PCT/US2020/020993, dated Jul. 2, 2020.
Written Opinion issued by the International Searching Authority in corresponding International Patent Application No. PCT/US2020/020993, dated Jul. 2, 2020.
Li, Zhen, et al., "Large area, highly transparent carbon nanotube spiderwebs for energy harvesting", Journal of Materials Chemistry, pp. 7236-7240, 2010.
Su, Fenghua, et al., "High-Performance Two-Ply Yarn Supercapacitors Based on Carbon Nanotube Yarns Dotted with Co3O4 and NiO Nanoparticles", Small 2015, pp. 854-861 with Supporting Information, 2015.
Zhang, Sen, et al., "Porous, Platinum Nanoparticle-Adsor bed Carbon Nanontube Yarns for Efficient Fiber Solar Cells", ACS Nano, pp. 7191-7198 with Supporting Information, 2012.

(56) References Cited

OTHER PUBLICATIONS

Communication dated Sep. 26, 2021, issued by the Korean Intellectual Property Office in related Korean Application No. 10-2018-0058433.

* cited by examiner

MULTIFUNCTIONAL CONDUCTIVE WIRE AND METHOD OF MAKING

CROSS REFERENCE TO RELATED APPLICATIONS

This application claims priority to U.S. Provisional Patent Application No. 62/813,516, filed Mar. 4, 2019 and entitled "Composite Yarn and Method of Making a Carbon Nanotube Composite Yarn", and is a continuation-in-part of U.S. patent application Ser. No. 16/446,389, filed Jun. 19, 2019 and entitled "Composite Yarn and Method of Making a Carbon Nanotube Composite Yarn"; the entirety of both are incorporated herein by reference.

BACKGROUND

Metal conductive wires, particularly copper wires, have been produced and utilized in many industrial sectors for many decades. However, recent demands for miniaturization of devices and optimization of energy efficiency place new challenging demands on the high volumetric and high gravimetric features of metal conductive wires, so new types of conductive wires are needed. For example, miniaturization of wire faces the limitation of quantum confinement for metal conductive wires. Introduction of new materials and multi-functional wires could be the solution for next generations of wires. Therefore, finding new methods for synthesis, fabrication, or engineering that will add more functions in conductive wires, instead of solely functioning as current carriers, is of central interest. The limitations of legacy copper wires are particularly critical for vehicles, for example, in some electric vehicles the motor can include about 76 kilograms of copper coils. Thus, new technologies for advanced conductive wires are needed.

SUMMARY

The present disclosure is directed to multifunctional conductive wires and methods of making multifunctional conductive wires. Multifunctional conductive wires (MCW) are enabled herein that have reduced weight compared to legacy conductors. The MCW disclosed herein can provide electrical power with less length and space required compared to legacy conductors. Methods for introducing new functions in MCW for alternating and direct current are disclosed herein. MCW that can have battery function, to simultaneously provide power while providing conduction, are disclosed herein. According to some aspects, electrodes and electrolyte can be at the core of a MCW, surrounded by an insulator, with a conducting layer external to the insulator, to form an AC MCW. In some embodiments, MCW can be turned in the shape of a coil, spiral, or helix, to simultaneously provide electromagnetic or induction properties and battery capability. These aspects and other aspects of the present disclosure are disclosed in more detail herein.

DETAILED DESCRIPTION

Figure 1A:
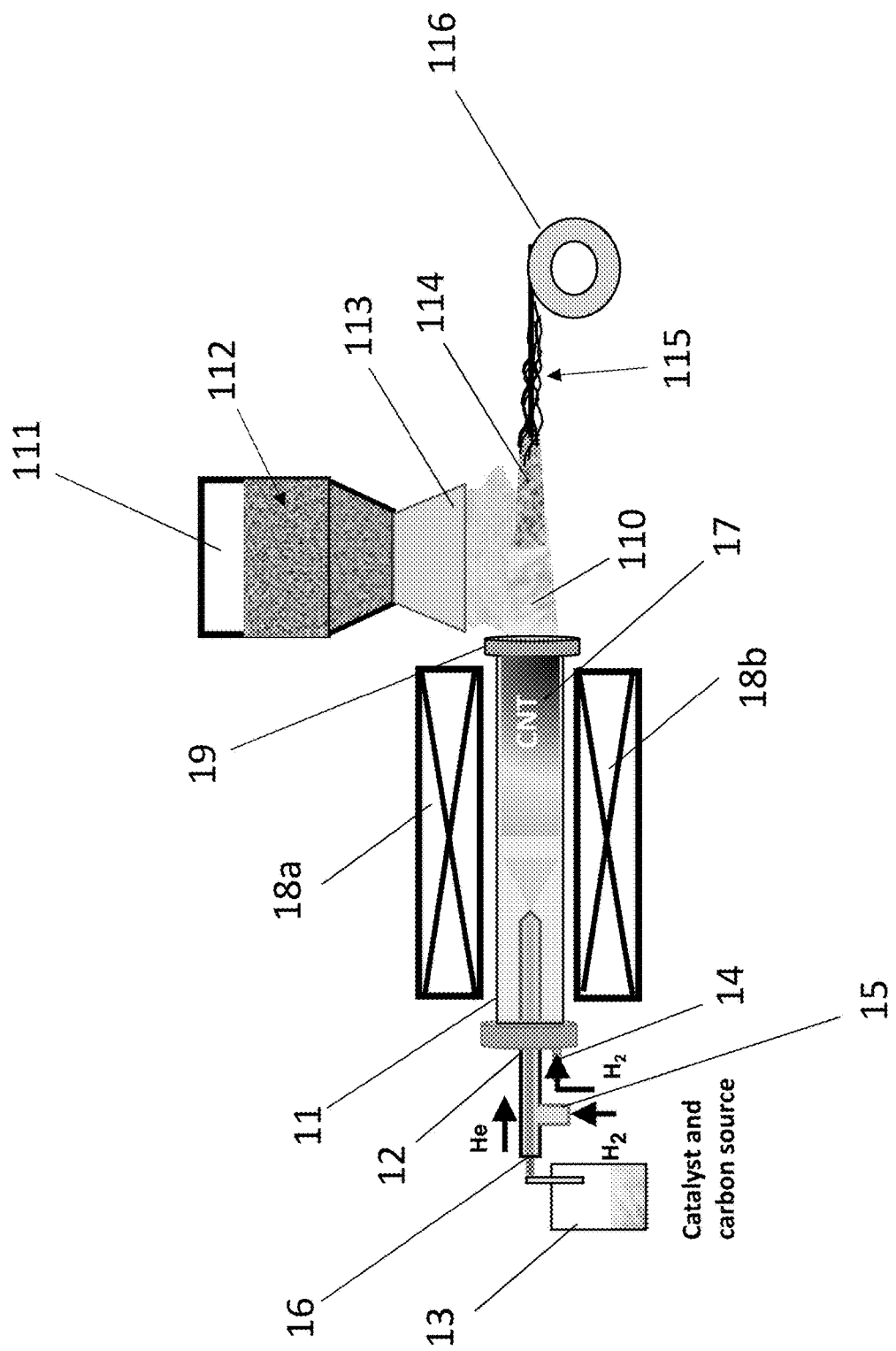
FIG. 1A shows an example schematic for preparing a carbon nanotube composite yarn according to aspects of the present disclosure.

The present disclosure is directed to multifunctional conductive wire and methods of making multifunctional conductive wire (MCW). According to some aspects, the MCW can be a wire comprising a core flexible cylinder that is sealed by an insulator layer, which is covered by an outer copper, or any other conductive metal layer. The core cylinder can be a cylindrical flexible battery that comprises two or more self-standing electrodes (e.g., carbon nanotube yarns with battery active materials) isolated by a separator and/or an electrolyte. In some embodiments, the cylindrical flexible battery in the core of the MCW can supply or store power. Depending on the application, one or more outer insulator layers comprising an insulating material can be applied to the outer conductive layer. Optionally, further layers of conductive material can be applied and further layers of insulating material.

According to some aspects of the MCW, the thickness of an outer conductive metal layer can be varied depending on the intended frequency of an alternating current (AC) to be carried by an outer conductive layer. The thickness can be varied such that conduction of alternating current is optimized, yet without the need for a heavy, central core metal (or copper) material that carries little alternating current. The skin effect is a tendency of an alternating current to have a current density largest near the outer surface of a conductor, with current density into a conductor decreasing with greater depths in a conductor, specifically as the frequency of the AC increases. Skin effect is caused by the back electromagnetic field, with an eddy current, produced by the self-induced magnetic flux in a conductor carrying an alternating current. For a direct current (DC), the rate of change of flux is zero, so there is no back electromagnetic field with an eddy current due to changes in magnetic flux. For a direct current, the current is uniformly distributed throughout the cross section of the conductor. For lower frequency AC, the central core of a solid metal wire carries little current; as the frequency of AC increases, the outer skin of a solid metal wire carries the majority of the current.

For higher frequency AC, the central core of a solid metal wire carries no current. For example, alternating current (AC) with a frequency of 60 Hz typically has a skin effect of about 7 to 8.5 mm in copper. In some embodiments, the thickness of a conducting layer can be selected based on the intended AC frequency for the MCW. Optionally, the intended amperage can be combined with the intended AC frequency in determining the thickness of a conducting layer. When applied to transmission of alternating current, the MCW disclosed herein can, at the core, provide a core cylinder battery, where alternating current density would be the least in a solid wire conductor. In some embodiments, providing a core cylinder battery at the core provides a MCW with less weight compared to solid metal wires while simultaneously providing a power source/storage battery in the MCW.

The depth to which AC current penetrates in a conductor can be defined by a skin depth, which can be described as the depth at which the current is reduced to 37% of its surface value. The skin depth decreases with increasing AC frequency. At low frequencies at which the skin depth is larger than the diameter of the wire, the skin effect is negligible, and the current distribution and resistance are virtually the same as at DC. As the frequency rises and the skin depth gets smaller than the wire diameter, skin effect becomes significant, the current is increasingly concentrated near the surface, and the resistance per unit length of wire increases above its DC value. Non-limiting examples of skin depth in copper wire at different frequencies are at 60 Hz, the skin depth of a copper wire is about 0.3 inches (7.6 mm); at 60 kHz, the skin depth of copper wire is about 0.01 inches (0.25 mm); at 6 MHz, the skin depth of copper wire is about 0.001 inches (25 µm). Round conductors such as wire or cables larger than a few skin depths do not conduct much current near their axis, so the metal located at the central part of the wire is not used effectively.

The MCW disclosed herein can utilize the central core of the MCW as a cylindrical flexible battery that comprises two or more self-standing electrodes. As used herein, the term "self-standing electrode" refers to an electrode capable of function without one or more components provided as a structural support. It should be understood that according to some aspects, any carbon nanotube composite yarn as described herein may be a self-standing electrode. Due to its nature, the MCW can carry AC, and the AC can be carried in a flexible conducting layer that surrounds the central core (cylindrical flexible battery), wherein AC would not be carried in a solid copper conductor due to the skin effect. In some embodiments, the cylindrical flexible battery comprises less weight than a solid metal conductor and simultaneously can provide and store power.

The MCW disclosed herein can also carry direct current (DC). Various components, as known in the art, can be included to convert DC, for example, from the core cylinder battery, to AC for current carrying in an outer conductive metal layer. In another example, AC in an outer conductive metal layer can be converted to DC for storage in a core cylinder battery. In a non-limiting example, diodes or processors can be utilized to change the frequency of a current to a higher frequency for transmission in the flexible conducting layer of the MCW. Similar diodes or processors can be utilized to change the frequency of a carried current for power storage in the core cylinder battery of the MCW. According to some aspects, voltage of current can be stepped up or down by one or more coils of MCW for transmission in a flexible conductive layer.

The outer shape of the MCW can be any shape. For example, round or cylindrical shape can be utilized for ease of fabrication or to resemble legacy metal wires. Square shape can, for example, be utilized to maximize efficiency when MCW is wound into a coil. In some electric motors, square shape of MCW can be utilized to maximize winding efficiency and minimize airspace between the windings of a coil. The outer shape can optionally be malleable and flexible.

The devices and articles comprising MCW disclosed herein are not limited by the examples provided. The applications of MCW can be large, for example, power transmission lines over long distances can weigh less utilizing MCW and can store or deliver power at designated areas of the MCW. As an illustrative example, a commercial jet comprising MCW can weigh less than a commercial jet comprising solid copper wire, silver-plated, or nickel-plated copper wire. The MCW can contain (either externally or embedded in) processors, transmitters, receivers, Wi-Fi, sensors, solar cells, and electronic components that determine areas or segments of the MCW that store or deliver power. The MCW can contain, for example, external, other conductors, other strengthening fibers, and fasteners. In some embodiments, vehicles, motors, machines, devices, and articles are disclosed herein that comprise MCW. An electrical motor can weigh significantly less using MCW, and such an electrical motor can have increased power to weight ratio compared to motors with solid metal wires. An electrical generator, a large generator in a power plant, or an alternator containing MCW, can weigh significantly less than the same device using solid copper wire. Transformers, which contain large coils of wire, can weigh less using MCW. Transmitters, antennae, and inductors are other illustrative examples. Storage of power by the MCW within power lines, vehicles, machines, and devices can reduce or eliminate the need for additional current carriers to carry power to an external storage battery or from an external storage battery.

In some embodiments, a device is disclosed herein that comprises one or more coils of MCW, each coil comprising MCW turned in the shape of a coil, spiral, or helix. Each coil can provide electromagnetic induction/generation while simultaneously providing battery and/or storage capabilities. Each coil of MCW can provide or store electrical energy and conduct electrical energy.

In some embodiments, the MCW disclosed herein can comprise two or more flexible electrodes, each flexible electrode comprising carbon nanotube composite yarn, the carbon nanotube composite yarn comprising carbon nanotubes and secondary particles, and optionally one or more separator membranes. According to some aspects, the one or more separator membranes may comprise a distinct separator membrane provided between the two or more flexible electrodes. As used herein, the term "distinct separator membrane" refers to a separator membrane as described herein that is not in direct contact with the two or more flexible electrodes. Additionally or alternatively, each flexible electrode may independently comprise an outer layer of separator membrane. In some examples, the outer layer of separator membrane(s) may eliminate the need for additional separator membranes placed between electrodes (e.g., a distinct separator membrane). The MCW may further comprise an electrolyte positioned between each of the two or more flexible electrodes.

In some embodiments, the two or more flexible electrodes can be wrapped around each other in a twisted configuration. It is known in the art that twisting two wires around each other significantly reduces electromagnetic interference (also called radio-frequency, RF, interference in the RF spectral region) in the wires. In some embodiments, wrapping or twisting the two or more flexible electrodes around each other can reduce or eliminate electromagnetic interference in the two or more flexible electrodes from alternating current (in the outer conductive layer) or from environmental sources. Optionally, the two or more flexible electrodes can be in a parallel or quasi-parallel configuration or not in contact with each other. A flexible insulator layer that surrounds the two or more flexible electrodes, the optional separator membrane(s), and the electrolyte can contain the two or more flexible electrodes and the electrolyte within the MCW, providing a battery within the MCW. A flexible conducting layer, for example, a metal layer, can surround the flexible insulator layer, with the thickness of the flexible conducting layer varied depending on the frequency of an alternating current carried by the flexible conducting layer. The flexible electrodes inside the MCW are self-standing flexible electrodes due to the carbon nanotubes contained therein, as described herein.

Methods of making the self-standing flexible electrodes are disclosed herein. A carbon nanotube composite yarn may be made by growing floating carbon nanotubes, continuously removing webs of the floating carbon nanotubes to provide a mat of the carbon nanotubes and, in parallel, depositing secondary particles on at least a portion of the mat of carbon nanotubes to provide a carbon nanotube composite mat, and densifying the carbon nanotube composite mat to provide a carbon nanotube composite yarn.

The method may comprise growing floating carbon nanotubes in a reactor. As used herein, the term "nanotube" refers to a tube having at least one dimension on the nanoscale, that is, at least on dimension between about 0.6 and 100 nm. For example, a nanotube may comprise a tube having a diameter on the nanoscale. According to some aspects, the nanotubes according to the present disclosure may be selected from the group consisting of single-walled carbon nanotubes (SWNTs), multi-walled carbon nanotubes (MWNTs), and combinations thereof.

The floating carbon nanotubes may be grown in a reactor, such as a chemical vapor deposition (CVD) reactor. For example, FIG. 1A shows an example reactor 11 that may be used according to aspects of the present disclosure. As shown in FIG. 1A, the reactor 11 may comprise at least a first inlet 12 in fluid communication with a carbon source chamber 13, the carbon source chamber 13 configured to provide a carbon source, such as a carbon source gas.

Examples of carbon sources include, but are not limited to, one or more carbon-containing gases, one or more hydrocarbon solvents, and mixtures thereof. Specific examples include, but are not limited to, gases and/or solvents containing and/or consisting of a hydrocarbon, an alcohol, an ester, a ketone, an aromatic, an aldehyde, and a combination thereof. For example, the carbon source may be selected from xylene, toluene, propane, butane, butene, ethylene, ethanol, carbon monoxide, butadiene, pentane, pentene, methane, ethane, acetylene, carbon dioxide, naphthalene, hexane, cyclohexane, benzene, methanol, propanol, propylene, commercial fuel gases (such as liquefied petroleum gas, natural gas, and the like), and combinations thereof.

The carbon source chamber 13 may also be configured to provide a catalyst and/or a catalyst precursor, such as a catalyst and/or a catalyst precursor vapor. As used herein, the term "catalyst" refers to a component that provokes or speeds up a chemical reaction, for example, the synthesis of nanotubes. Examples of catalysts useful according to the present disclosure include, but are not limited to, transition metals, lanthanide metals, actinide metals, and combinations thereof. For example, the catalyst may comprise a transition metal such as chromium (Cr), molybdenum (Mo), tungsten (W), iron (Fe), cobalt (Co), nickel (Ni), ruthenium (Ru), rhodium (Rh), palladium (Pd), osmium (Os), iridium (Ir), copper (Cu), silver (Ag), gold (Au), cadmium (Cd), scandium (Sc), yttrium (Y), lanthanum (La), platinum (Pt), and/or combinations thereof. The catalyst may be a supported catalyst or an unsupported catalyst. According to some aspects, a combination of two or more metals may be used, for example, an iron, nickel, and cobalt mixture. In one example, the mixture may comprise a 50:50 mixture (by weight) of nickel and cobalt. The catalyst may comprise a pure metal, a metal oxide, a metal carbide, a nitrate salt of a metal, other compounds containing one or more of the metals described herein, and/or a combination thereof.

As used herein, the term "catalyst precursor" refers to a component that can be converted into an active catalyst. Examples of catalyst precursors include, but are not limited to, transition metal salts, such as a nitrate, acetate, citrate, chloride, fluoride, bromide, iodide, and/or hydrates thereof, and combinations thereof. For example, the catalyst precursor may be a metallocene, a metal acetylacetonate, a metal phthalocyanine, a metal porphyrin, a metal salt, a metalorganic compound, a metal sulfate, a metal hydroxide, a metal carbonate, or a combination thereof. For example, the catalyst precursor may be a ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may comprise a soluble salt such as $Fe(NO_3)_3$, $Ni(NO_3)_2$ or $Co(NO_3)_2$ dissolved in a liquid such as water. The catalyst precursor may achieve an intermediate catalyst state in the catalyst particle growth zone of the reactor, and subsequently become converted to an active catalyst upon exposure to the nanostructure growth conditions in the nanostructure growth zone of the reactor. For example, the catalyst precursor may be a transition metal salt that is converted into a transition metal oxide in the catalyst particle growth zone, then converted into active catalytic nanoparticles in the nanostructure growth zone.

It should be understood that while FIG. 1A shows a carbon source chamber 13 containing both a carbon source and a catalyst and/or catalyst precursor, the carbon source chamber 13 in fluid communication with the reactor 11 via the first inlet 12, the carbon source and the catalyst and/or catalyst precursor may be provided in separate chambers optionally in fluid communication with the reactor 11 via separate inlets.

The carbon source and catalyst and/or catalyst precursor may be provided to the reactor via a carrier gas, such as an inert carrier gas. For example, FIG. 1A shows the carbon source and catalyst and/or catalyst precursor provided to the reactor 11 via a helium (He) gas. Examples of inert gases useful according to the present disclosure include, but are not limited to, gases comprising helium (He), radon (Rd), neon (Ne), argon (Ar), xenon (Xe), nitrogen (N), and combinations thereof.

As shown in FIG. 1A, the reactor 11 may be provided with a second inlet 14. The second inlet 14 may be in fluid communication with, for example, a hydrogen gas source, which may be provided in order to provide a higher growth yield and/or to control SWNT vs. MWNT production. Hydrogen gas may additionally or alternatively be provided via a third inlet 15 that is in fluid communication with a carbon source chamber passage 16, the carbon source chamber passage 16 configured to provide fluid communication between the carbon source chamber 13 and the first inlet 12. In reactor 11, floating carbon nanotubes 17 can be grown, as shown in FIG. 1A. As used herein, the term "floating" refers to a state of being suspended, for example, suspended in a gas or liquid. As shown in FIG. 1A, the floating carbon nanotubes 17 may be suspended in the inert gas as described herein. The temperature of the reactor 11 may be maintained and/or varied using one or more heat sources 18a and 18b. In an illustrative example, heat sources 18a and 18b may individually or together comprise a furnace or a lamp. The one or more heat sources 18a and 18b may be proximal to reactor 11 and may maintain the temperature of reactor 11 at a temperature suitable for reducing the catalyst precursor into active catalyst and/or for the synthesis and/or formation of carbon nanotubes. According to some aspects, the one or more heat sources 18a and 18b may maintain the temperature of reactor 11 at a temperature of between about 300 and 1800° C., optionally between about 450 and 1600° C.

Figure 2:
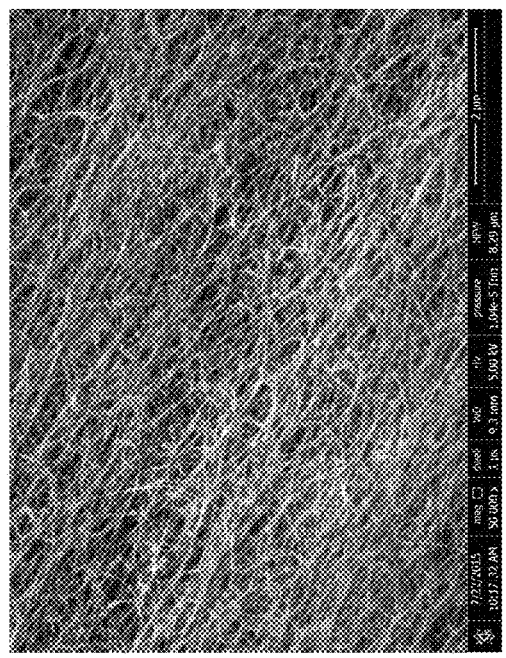
FIG. 2 shows a Scanning Electron Microscope (SEM) image of a pure carbon nanotube mat according to aspects of the present disclosure.
Figure 3:
FIG. 3 shows a photograph of a pure carbon nanotube mat according to aspects of the present disclosure.

The method may comprise providing a structure including, but not limited to, a mat of the carbon nanotubes, alternatively referred to herein as a "web." As used herein, the term "mat" or "web" refers to a tangled or bundled mass, such as a tangled, non-densified mass formed downstream of the nanotube growth zone by the floating carbon nanotubes. The mat of carbon nanotubes may be provided, for example, in and/or on the reactor and/or by continuously pulling the floating carbon nanotubes from the reactor. For example, FIG. 1A shows an example of floating carbon nanotubes 17 prepared in a nanotube growth zone of reactor 11. A mat of carbon nanotubes 110 may then form in reactor 11 downstream of the nanotube growth zone. The mat of carbon nanotubes 110 may deposit on the inner walls of reactor 11 and/or along the edges of outlet 19 of reactor 11. The mat of carbon nanotubes 110 may be pulled from reactor 11 through outlet 19 via a high flow rate of the carrier gas and/or hydrogen gas, as described herein. FIG. 2 shows an SEM image of a pure carbon nanotube mat, for example, a mat of carbon nanotubes 110 as shown in FIG. 1A. FIG. 3 shows a photograph of a pure carbon nanotube mat, for example, a mat of carbon nanotubes 110 as shown in FIG. 1A.

The method may comprise depositing a secondary material on at least a portion of the carbon nanotubes to provide a carbon nanotube composite yarn. According to some aspects, the method may comprise depositing a secondary material on at least a portion of the mat of carbon nanotubes to provide a carbon nanotube composite mat followed by a densification step wherein the carbon nanotube composite mat is densified to provide a carbon nanotube composite yarn. The method can comprise a simultaneous deposition and densification step, wherein the secondary material is deposited on at least a portion of the mat of carbon nanotubes while the mat of carbon nanotubes is simultaneously densified to provide a carbon nanotube composite yarn. According to some aspects, the deposition and/or densification steps may be continuous steps performed in parallel with continuously pulling the mat of carbon nanotubes from the reactor, as described herein.

As used herein, the term "secondary material" refers to a material comprising at least one material that is different from the carbon nanotube mat. Examples of materials useful as secondary materials according to the present disclosure include, but are not limited to, electrode active material(s), metals, metal oxides, lithium metal oxides, lithium iron phosphate, ceramics, carbon-based materials, and combinations thereof. Examples of carbon-based materials include, but are not limited to, graphite particles, graphite and graphene flakes, hard carbon, and combinations thereof.

In an illustrative example, the carbon-based material is an electrode active material for use in an electrode of a battery. Electrode active materials can be metal oxides. Examples of metal oxides include, but are not limited to, any metal oxide that may be used as an electrode active material in an electrode. In an illustrative example, the metal oxide is a material for use in the cathode of a battery. Non-limiting examples of metal oxides include those that comprise Ni, Mn, Co, Al, Mg, Ti, or any mixtures thereof. The metal oxide may be lithiated. In an illustrative example, the metal oxide is lithium nickel manganese cobalt oxide (LiNiMnCoO$_2$), Li(Ni,Mn,Co)O$_2$, Li—Ni—Mn—Co—O, or (LiNi$_x$Mn$_y$Co$_z$O$_2$, x+y+z=1). The metal oxide can be represented by Li-Me-O. Metals in lithium metal oxides according to the present disclosure may include, but are not limited to, one or more alkali metals, alkaline earth metals, transition metals, aluminum, or post-transition metals, and hydrates thereof. In some embodiments, the electrode active material is selected from graphite, hard carbon, metal oxides, lithium metal oxides, and lithium iron phosphate. In some embodiments, the electrode active material for the anode may be a carbon-based material as described herein, including but not limited to graphite particles, graphite flakes, graphene flakes, hard carbon, and combinations thereof. The electrode active material may be any solid, metal oxide powder that is capable of being aerosolized. The metal oxide powders can have a particle size defined within a range between about 1 nanometer and about 100 microns. In a non-limiting example, the metal oxide particles have an average particle size of about 1 nanometer to about 10 nanometers.

Figure 6A:
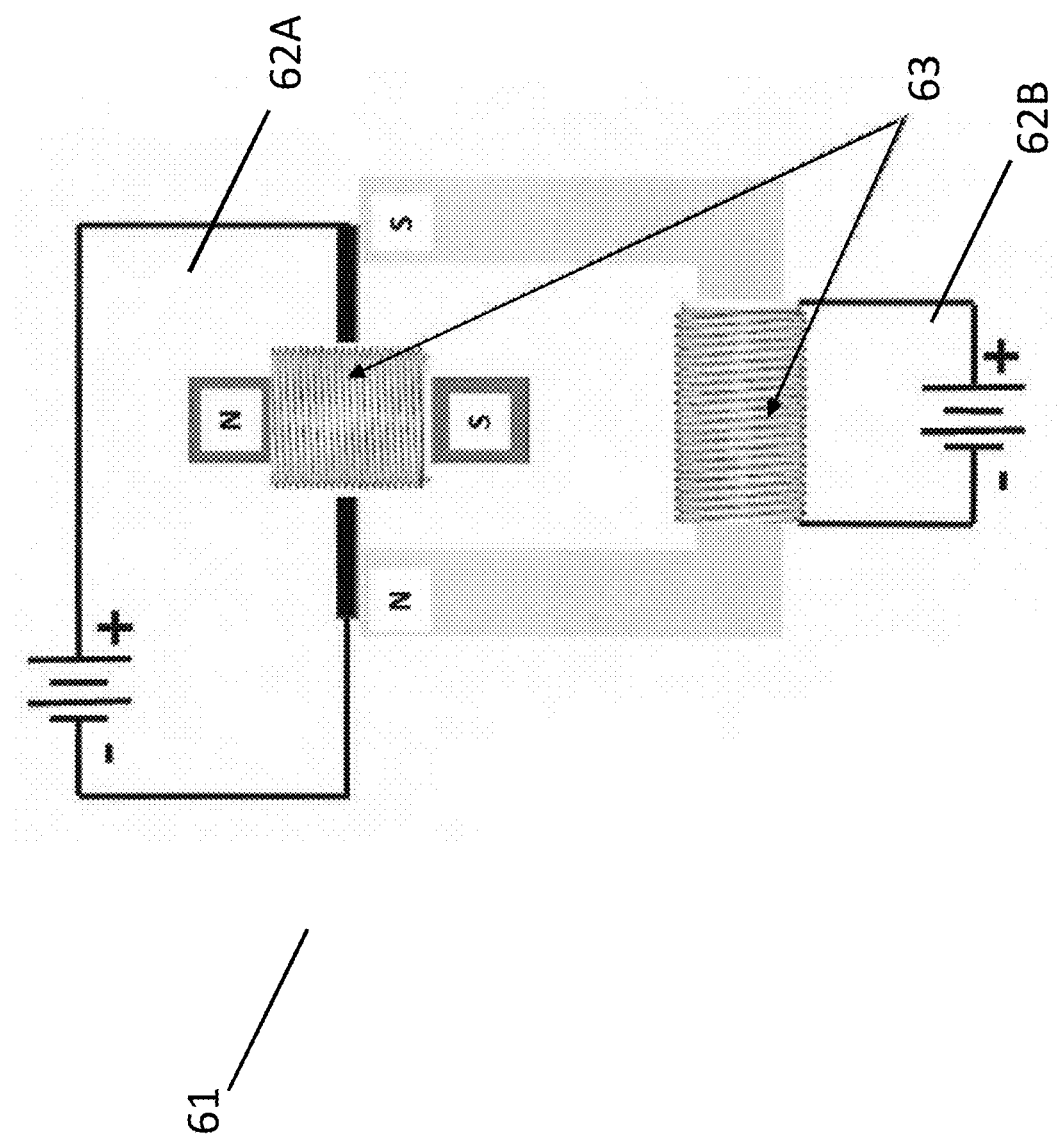
FIG. 6A shows a conventional electrical motor powered by one or more external batteries.
Figure 6B:
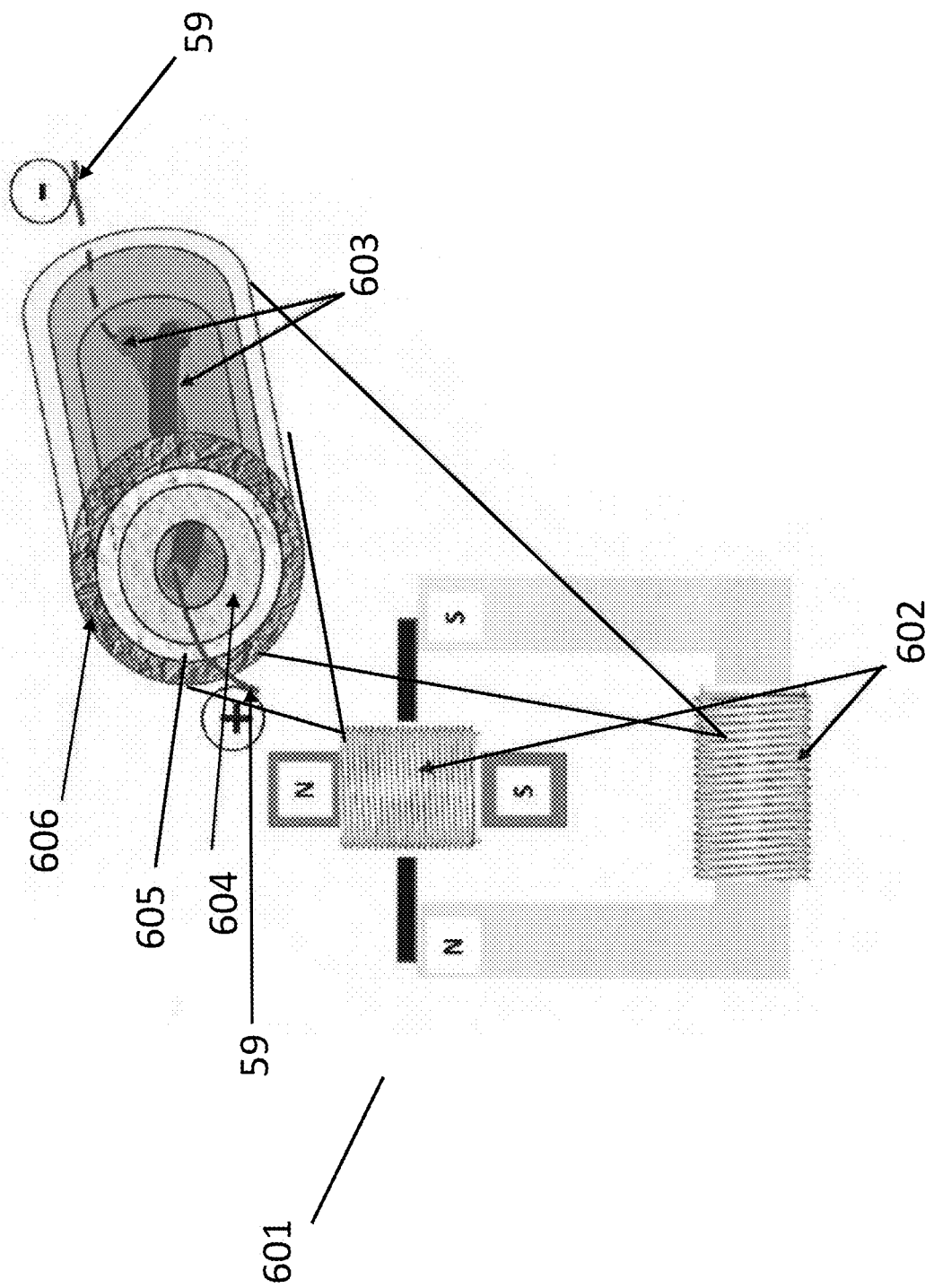
FIG. 6B shows an electrical motor powered by a multifunctional cable or MCW that accommodates a battery in the core, according to some aspects of the present disclosure.

According to some aspects, carbon nanotube yarn-based composite, flexible self-standing electrodes for anode and cathode are formed by incorporation of graphite flakes or Li-Me-O particles, correspondingly in CNT yarn. According to some aspects, he thread-like electrodes can optionally be twisted together and electrolyte can be added following by covering with polymer-based insulator material. A copper (or other metal) layer can be deposited on the surface of thread like battery with a desired thickness. The surface layer of the resulting cable or MCW serves as a typical conductor for AC current (e.g., for electrical vehicle motor) while the "core" of the cable can provide the energy as a battery (FIG. 6B). The thickness of deposited Cu layer can be varied depending on frequency of exploited AC current. The terms "cable" and MCW are utilized interchangeably herein to refer to various embodiments of multifunctional conductive wire. The term "cable" does not limit the MCW disclosed herein to one insulator layer or one outer conductive metal layer because the MCW disclosed herein can have, in various embodiments, more than one insulator layer and more than on conductive metal or current carrier layer.

In some embodiments, the thickness of a conducting layer can be determined according to the frequency of AC to be carried by MCW. For DC, the resistance of a solid-metal conductor depends on its cross-sectional area; a conductor with a larger area has a lower resistance for a given length. At high frequencies, AC does not penetrate deeply into conductors due to eddy currents induced in the material; it tends to flow near the surface, known as skin effect. Since less of the cross-sectional area of the wire is being used, the resistance of the wire is greater than it is for DC. The higher the frequency of the current, the smaller the depth to which the current penetrates, and the current is carried into an increasingly smaller cross-sectional area along the surface, so the AC resistance of wire increases with frequency. The MCW disclosed herein can have a specific thickness of a conducting layer, optimum for a specific range of AC frequencies, or optimum for a specific device. The electrodes disclosed herein can be in various configurations to prevent or enhance proximity effects.

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e., higher than the negative electrode). "Negative electrode" and "anode" are used synonymously in the present description and refer to the electrode having the lower electrode potential in an electrochemical cell (i.e., lower than the positive electrode). Cathodic reduction refers to a gain of electron(s) of a chemical species, and anodic oxidation refers to the loss of electron(s) of a chemical species.

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, gallium, indium, tin, thallium, lead, bismuth, or polonium.

According to some aspects, the secondary material may be provided as secondary particles that are deposited on at least a portion of the mat of carbon nanotubes. According to some aspects, the particles may have a particle size from about 1 nanometer to about 100 microns, optionally from about 1 nanometer to about 10 nanometers. FIG. 1A shows a secondary particle chamber 111 containing secondary particles 112 as described herein. The secondary particle chamber 111 may comprise at least one outlet 113 proximal to outlet 19 of reactor 11. In this way, the mat of carbon nanotubes 110 leaving reactor 11 via outlet 19 may be subjected to secondary particles 112. While FIG. 1A shows only one secondary particle chamber 111, two, three, or more secondary particle chambers may be provided, wherein each of the plurality of secondary particle chambers comprises the same type or a different type of secondary particles from at least one other of the plurality of secondary particle chambers.

The secondary particle chamber 111 and delivery mechanism is not limited. In a non-limiting example, the secondary particle chamber 111 may include one or more of belt feeders, gravimetric feeders, pneumatic feeders, vacuum feeders, screw feeders, vibratory feeders, volumetric feeders, and valves.

According to some aspects, the secondary particles may be provided via one or more carriers. Examples of carriers include any substance known in the art configured to supply secondary particles to a substrate (for example, a mat of carbon nanotubes) as described herein without damaging the carbon nanotubes and/or the secondary particles. Examples of suitable carriers include gas carriers, liquid carriers, and combinations thereof. Example gas carriers include, but are not limited to, Ar, He, $N_2$, dry air, and combinations thereof. Example liquid carriers include, but are not limited to, water, acetone, ethanol, and combinations thereof. According to some aspects, the one or more carriers may be provided with the secondary particles 112 in the secondary particle chamber 111, as shown in FIG. 1A. Alternatively or additionally, one or more additional carrier chambers (not shown) may be provided such that the carrier and secondary particles are in communication prior to being deposited on the mat of carbon nanotubes. It should also be understood that a carrier may be excluded from the process as described herein such that the secondary particles are deposited on at least a portion of the mat of carbon nanotubes, for example, as a powder.

Figure 4:
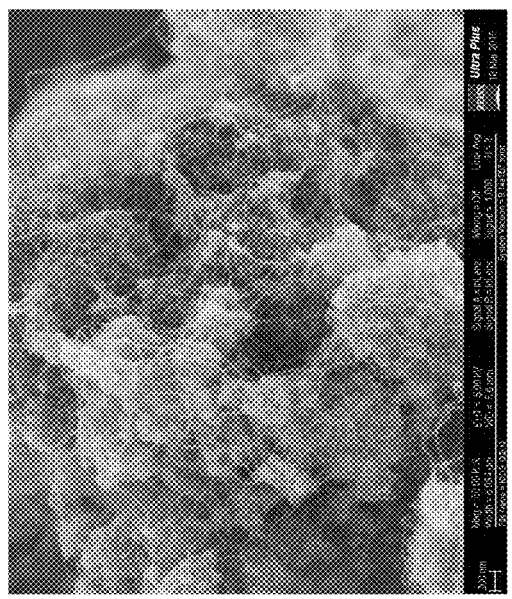
FIG. 4 shows an SEM of a carbon nanotube composite mat according to aspects of the present disclosure.

FIG. 1A shows a carbon nanotube composite mat 114 comprising at least a portion of secondary particles 112. FIG. 4 shows an SEM image of a carbon nanotube composite mat, for example, a carbon nanotube composite mat 114 as shown in FIG. 1A, comprising carbon nanotubes and a metal oxide powder. According to some aspects, the carbon nanotube composite mat may comprise 90% (w/w) or less carbon nanotube, optionally 80% (w/w) w/w or less, optionally 70% (w/w) w/w or less, optionally 60% (w/w) w/w or less, optionally 50% (w/w) w/w or less, optionally 40% (w/w) w/w or less, optionally 30% (w/w) w/w or less, optionally 20% (w/w) w/w or less, optionally 10% (w/w) w/w or less, optionally 9% (w/w) w/w or less, optionally 8% (w/w) w/w or less, optionally 7% (w/w) w/w or less, optionally 6% (w/w) w/w or less, optionally 5% (w/w) w/w or less, optionally 4% (w/w) w/w or less, optionally 3% (w/w) w/w or less, optionally 2% (w/w) w/w or less, and optionally 1% (w/w) w/w or less. According to some aspects, the carbon nanotube composite mat may comprise 10% (w/w) or more secondary particles, optionally 20% (w/w) or more secondary particles, optionally 30% (w/w) or more secondary particles, optionally 40% (w/w) or more secondary particles, optionally 50% (w/w) or more secondary particles, optionally 60% (w/w) or more secondary particles, optionally 70% (w/w) or more secondary particles, optionally 80% (w/w) or more secondary particles, optionally 90% (w/w) or more secondary particles, optionally 91% (w/w) or more, optionally 92% (w/w) or more, optionally 93% (w/w) or more, optionally 94% (w/w) or more, optionally 95% (w/w) or more, optionally 96% (w/w) or more, optionally 97% (w/w) or more, optionally 98% (w/w) or more, and optionally 99% (w/w) or more. According to some aspects, the carbon nanotube composite mat may comprise from 0.1% to 4% (w/w) carbon nanotubes, and the balance secondary particles and optionally one or more additives. Optionally, the carbon nanotube composite mat may comprise from 0.2% to 3% (w/w) carbon nanotubes, and the balance secondary particles and optionally one or more additives. Optionally the carbon nanotube composite mat may comprise from 0.75% to 2% (w/w) carbon nanotubes, and the balance secondary particles and optionally one or more additives. Additives and/or dopants may be present for each range in an amount of from 0 to 5% (w/w). In a non-limiting example, the carbon nanotube composite mat consists essentially of the carbon nanotubes and the secondary particles. In a non-limiting example, the carbon nanotube composite mat consists of the carbon nanotubes and the secondary particles.

The method may comprise densifying the carbon nanotube composite mat to provide a carbon nanotube composite yarn as described herein. For example, the carbon nanotube composite mat may be subjected to a liquid bath and/or a rolling press and/or a spindle and/or a cylindrical pipe and/or a tube, such as by spinning, pulling, and/or passing the carbon nanotube composite mat through or around the liquid bath and/or the rolling press and/or the spindle and/or the cylindrical pipe and/or the tube. In this way, the carbon nanotube composite mat 114 may be compacted to provide a carbon nanotube composite yarn 115, for example, as shown in FIG. 1A.

As shown in FIG. 1A, the carbon nanotube composite yarn 115 may be further processed, for example, by spinning the carbon nanotube composite yarn 115 around a spool 116. Alternatively, or additionally, the further processing step(s) may comprise removing excess secondary material from the carbon nanotube composite mat and/or the carbon nanotube composite yarn, for example, via shaking. It should be understood that one or more of the further processing step(s) may occur prior to and/or after the densification step(s) as described herein.

Figure 1B:
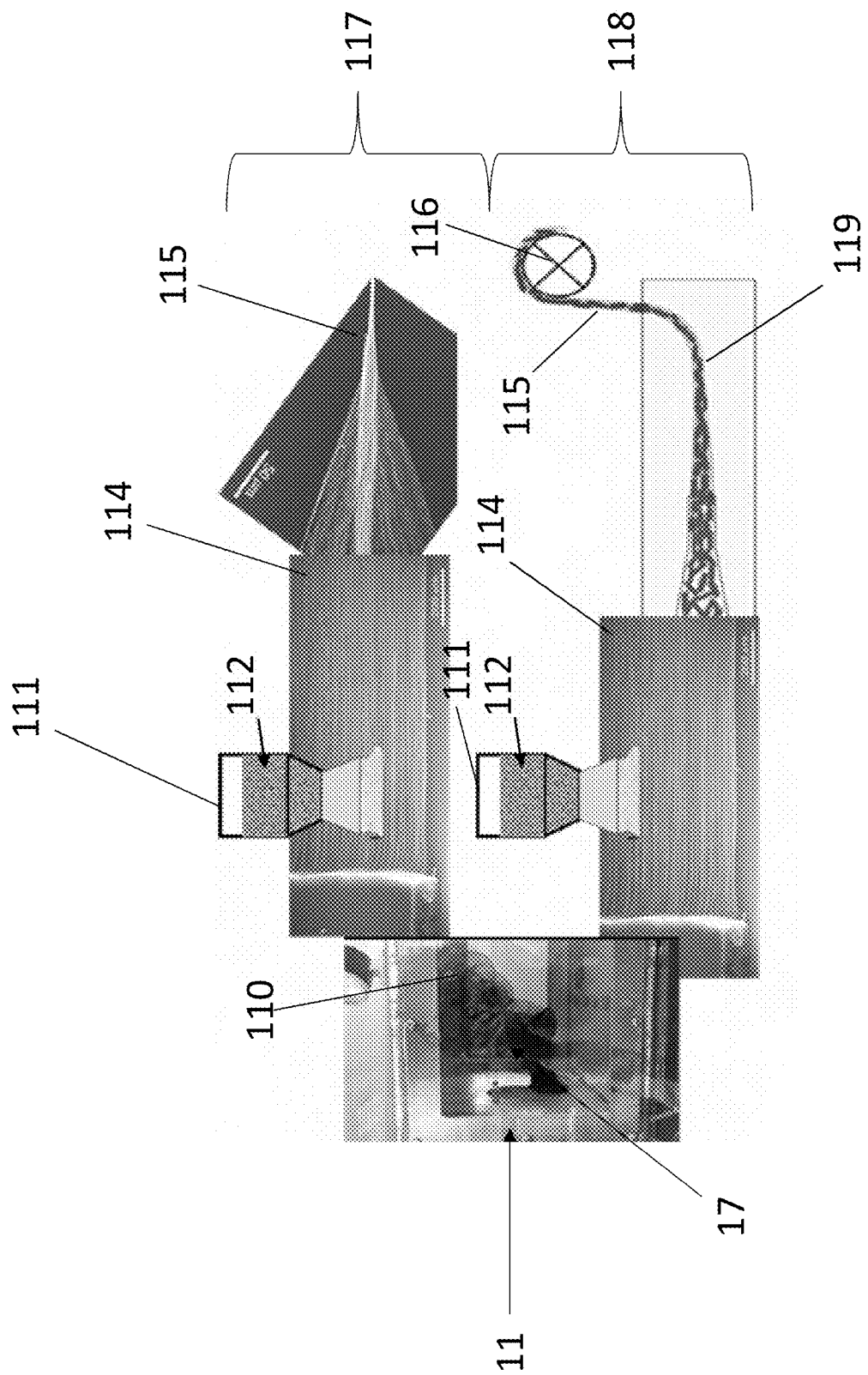
FIG. 1B shows a schematic of two example densification steps according to aspects of the present disclosure.

FIG. 1B shows two example densification steps as described herein. In particular, FIG. 1B shows floating carbon nanotubes 17 grown in a reactor 11 to provide a mat of carbon nanotubes 110, for example, as described in relation to FIG. 1A. FIG. 1B further shows a secondary particle chamber 111 containing secondary particles 112 as described in relation to FIG. 1A. FIG. 1B further shows two example densification steps, including a spinning densification step 117 and a liquid bath densification step 118. In particular, a spinning densification step 117 may comprise spinning a carbon nanotube composite mat 114 (carbon nanotube composite mat 114 comprising at least a portion of secondary particles 112 as described herein) through or around a rolling press and/or a spindle in order to form a carbon nanotube composite yarn 115 as described herein, similar to the example shown in FIG. 1A.

FIG. 1B also shows a liquid bath densification step 118, which may be performed instead of or in addition to spinning densification step 117. As shown in FIG. 1B, liquid bath densification step 118 may comprise subjecting a carbon nanotube composite mat 114 as described herein to a liquid bath 119 comprising a solvent. According to some aspects, the solvent may be any solvent known in the art configured to densify a mat of carbon nanotubes as described herein. Example solvents include, but are not limited to, water, acetone, ethanol, and combinations thereof. It should be understood that subjecting the carbon nanotube composite mat 114 to the liquid bath 119 comprising the solvent may provide a carbon nanotube composite yarn 115, as shown in FIG. 1B, which may be further processed as described herein, for example, by spinning the carbon nanotube composite yarn 115 around a spool 116. The further processing step(s) may be selected such that at least a portion of the solvent adhered to the carbon nanotube composite yarn 115 after it has been subjected to liquid bath 119 evaporates from the carbon nanotube composite yarn 115.

The method may comprise a simultaneous deposition and densification step as described herein, wherein the secondary material is deposited on at least a portion of the mat of carbon nanotubes while the mat of carbon nanotubes is simultaneously or about simultaneously densified to provide a carbon nanotube composite yarn. For example, the carrier as described herein may be configured to simultaneously deposit the secondary particles on the mat of carbon nanotubes and densify the mat of carbon nanotubes. One non-limiting example of such a step comprises the use of a solvent as described herein, wherein the solvent is used as a carrier to deposit the secondary particles on the mat of carbon nanotubes, as described herein. The solvent may simultaneously densify the mat of carbon nanotubes as described herein (e.g., as described in relation to liquid bath densification step 118 shown in FIG. 1B) to provide a carbon nanotube composite yarn. It should be understood that the simultaneous deposition and densification step may be performed instead of or in addition to one or more other steps as described herein, including one or more additional deposition steps, one or more additional densification steps, one or more additional simultaneous deposition and densification steps, one or more additional processing steps, and combinations thereof, wherein each additional step is individually performed before or after the simultaneous deposition and densification step.

The entire process for making the carbon nanotube composite yarn may be a continuous process. For example, the carbon source may be fed continuously to the reactor 11 so that the carbon nanotube mat may be continuously fed to the secondary particle chamber 111 for continuous deposition of the secondary particles, and the resulting composite structure may be continuously processed to form the carbon nanotube composite yarn. It is to be understood, however, that one or more stages may be performed separately in a continuous, batch, or semi-batch operation. For example, individual segments of carbon nanotube mats may be fed to the secondary particle chamber 111 for deposition of the particles thereon. The resulting composite structure may go through additional processing to evenly distribute the particles throughout the carbon nanotube mat.

After varying degrees of densification, the carbon nanotube composite yarn is a self-standing flexible electrode, and the carbon nanotube composite yarn can optionally be covered externally with a separator membrane. As a self-standing flexible electrode, the carbon nanotube composite yarn can comprise carbon nanotubes as described herein having secondary particles as described herein deposited thereon. The carbon nanotube yarn can be an electrode (such as an electrode for a battery), an electrode for a multifunctional conductive wire, a supercapacitor, a solar cell, a thermoelectric material, a sensor, an actuator, an element of an electronic device, an interconnect, or an E-textile, depending on the densification, dopants, secondary particles, and various conditions used during or after production of the carbon nanotube composite yarn.

The self-standing flexible electrodes can be internal to a cable having at least two electrodes, and optionally one or more separator membranes between the at least two electrodes in some cases (e.g., in the use of liquid electrolyte), wherein at least one of the electrodes comprises a carbon nanotube composite yarn as disclosed herein. According to some aspects, at least two of the electrodes each comprises a carbon nanotube composite yarn as disclosed herein. The cable may further comprise an electrolyte, an insulator layer, and a conducting layer.

Figure 5A:
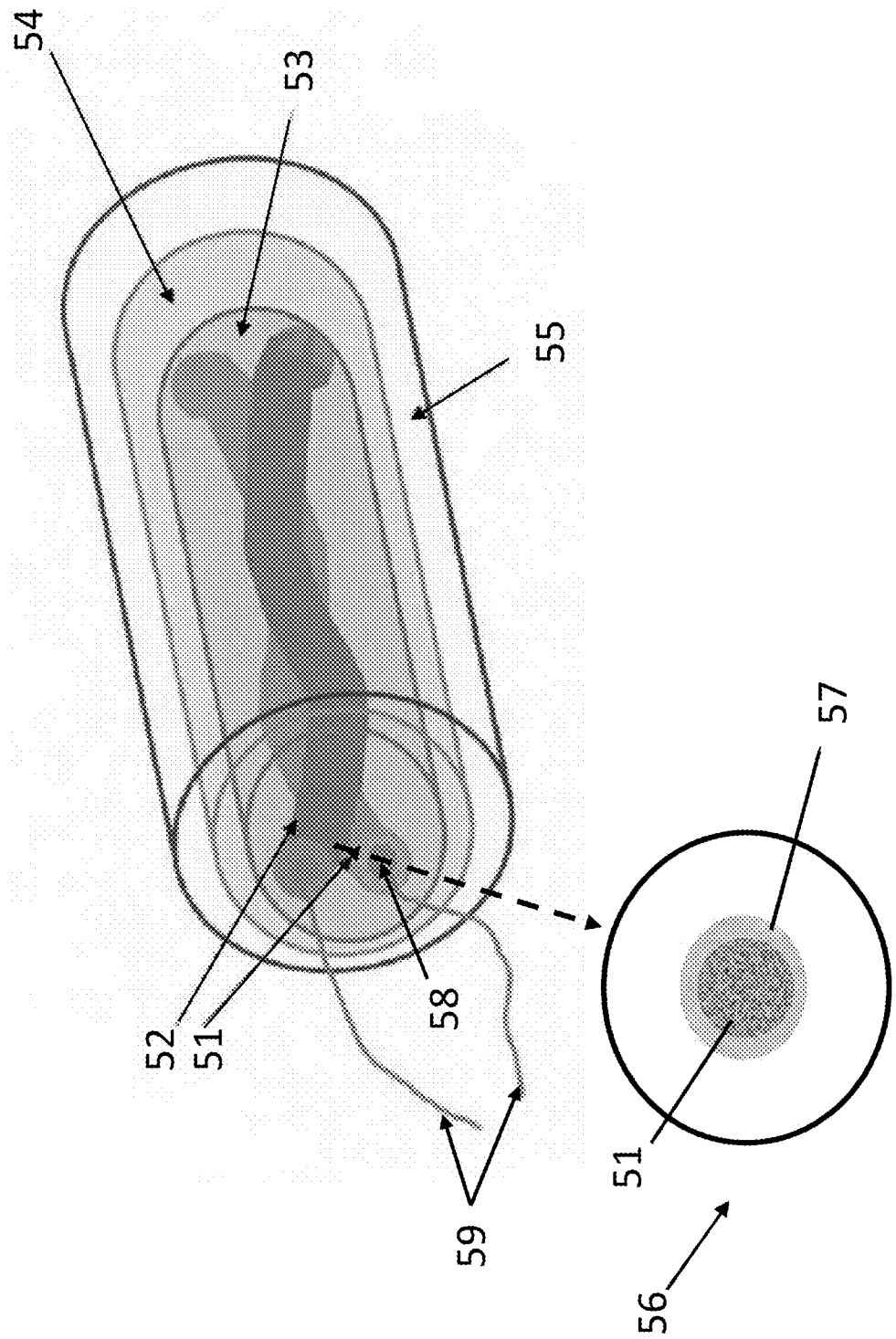
FIG. 5A shows an example cable or MCW that includes battery electrodes, according to some aspects of the present disclosure.

FIG. 5A shows an example cable or MCW according to aspects of the present disclosure. In particular, FIG. 5A shows a cable having a first electrode 51 (e.g., an anode) and a second electrode 52 (e.g., a cathode), wherein each of the first and second electrodes individually comprises a carbon nanotube composite yarn as disclosed herein. For example, the first electrode 51 may comprise a carbon nanotube composite yarn comprising a first secondary material, and the second electrode 52 may comprise a carbon nanotube composite yarn comprising a second secondary material. The first secondary material and the second secondary material may be the same or different. In some non-limiting examples, the first secondary material may comprise graphite flakes and the second secondary material may comprises Li-Me-O particles.

According to some aspects, the cable or MCW may comprise the first electrode 51 and the second electrode 52 in a coaxial configuration, that is, wherein an axis of the first electrode 51 and an axis of the second electrode 52 are parallel or quasi-parallel, as shown in FIG. 5A. It should be understood that in this example, "quasi-parallel" refers to a relationship between the axes such that the axes extend in the same direction and do not overlap one another. According to some aspects, the cable or MCW may comprise the first electrode 51 and the second electrode 52 in a twisted configuration. It should be understood that in this example, a "twisted configuration" may refer to a configuration wherein the first electrode 51 and the second electrode 52 are wrapped around one another.

According to some aspects, the first electrode 51 and the second electrode 52 may be separated from each other by a separator membrane (e.g., nafion). For example, FIG. 5A shows an expanded view 56 of the first electrode 51, which includes a carbon nanotube composite yarn as described herein. The first electrode 51 may be surrounded by a separator membrane 57 as described herein. It should be understood that the second electrode 52 may have a similar configuration. It should also be understood that in some cases, neither the first nor second electrode may be surrounded by a separator membrane. FIGS. 5B-5E, as described below, show several non-limiting example arrangements. According to some aspects, the first electrode 51 and the second electrode 52 are not in direct contact with each other.

The MCW or cable may further comprise an electrolyte (e.g., a liquid, gel, solid, or combination thereof) 53 substantially surrounding the first electrode 51 and the second electrode 51, an insulator layer 54 substantially surrounding the electrolyte 53, and a conducting layer 55 substantially surrounding the insulator layer 54.

Figure 5B:
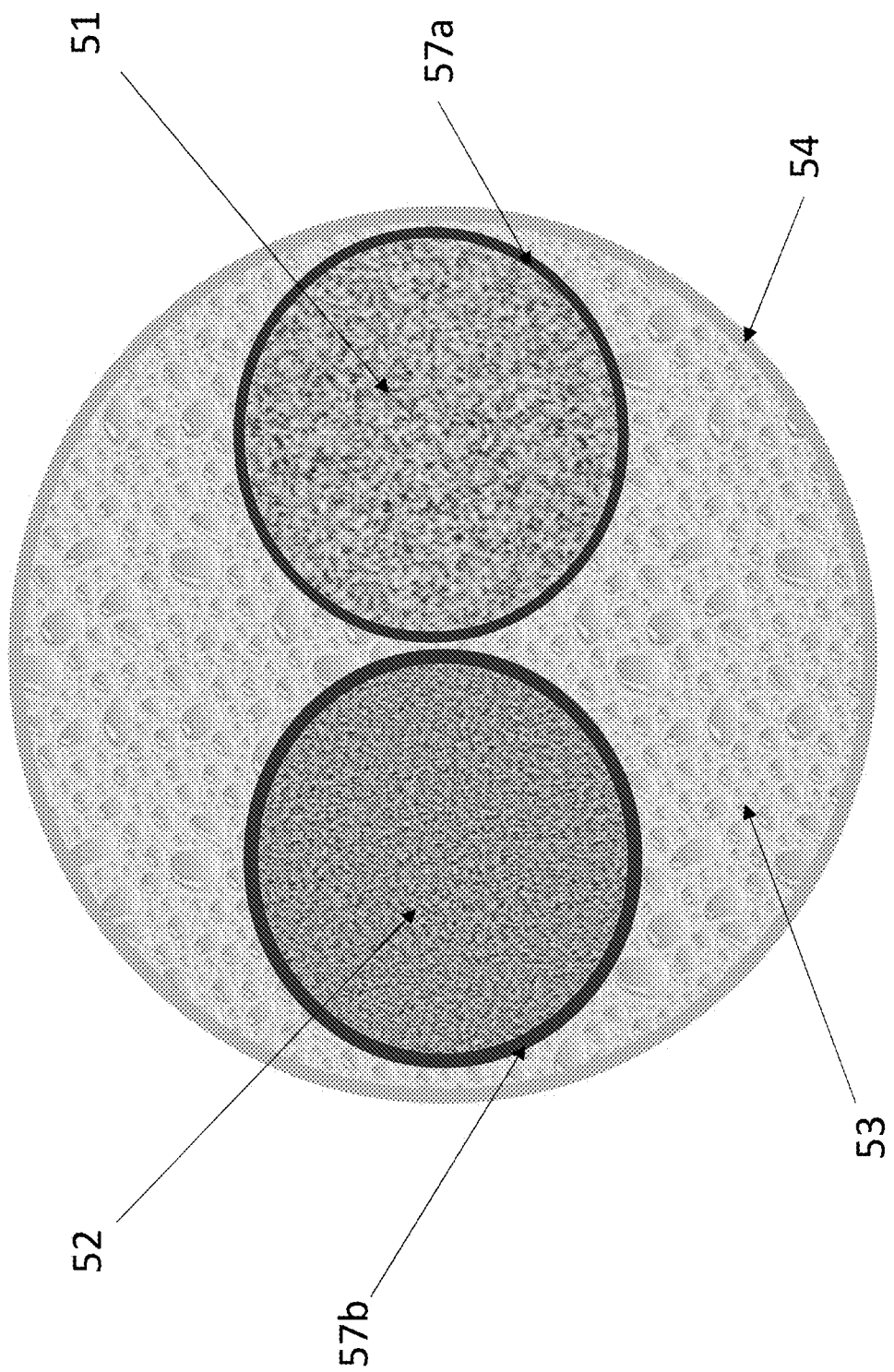
FIG. 5B shows an example cross-sectional schematic of an MCW according to some aspects of the present disclosure.

FIG. 5B shows an example cross-sectional schematic of an MCW according to aspects of the present disclosure, including a first electrode 51, a second electrode 52, and an insulator layer 54 substantially surrounding an electrolyte 53 (in this example, a liquid electrolyte), as described herein. In this example, first electrode 51 and second electrode 52 are surrounded by separator membranes 57a and 57b, respectively, as described herein.

Figure 5C:
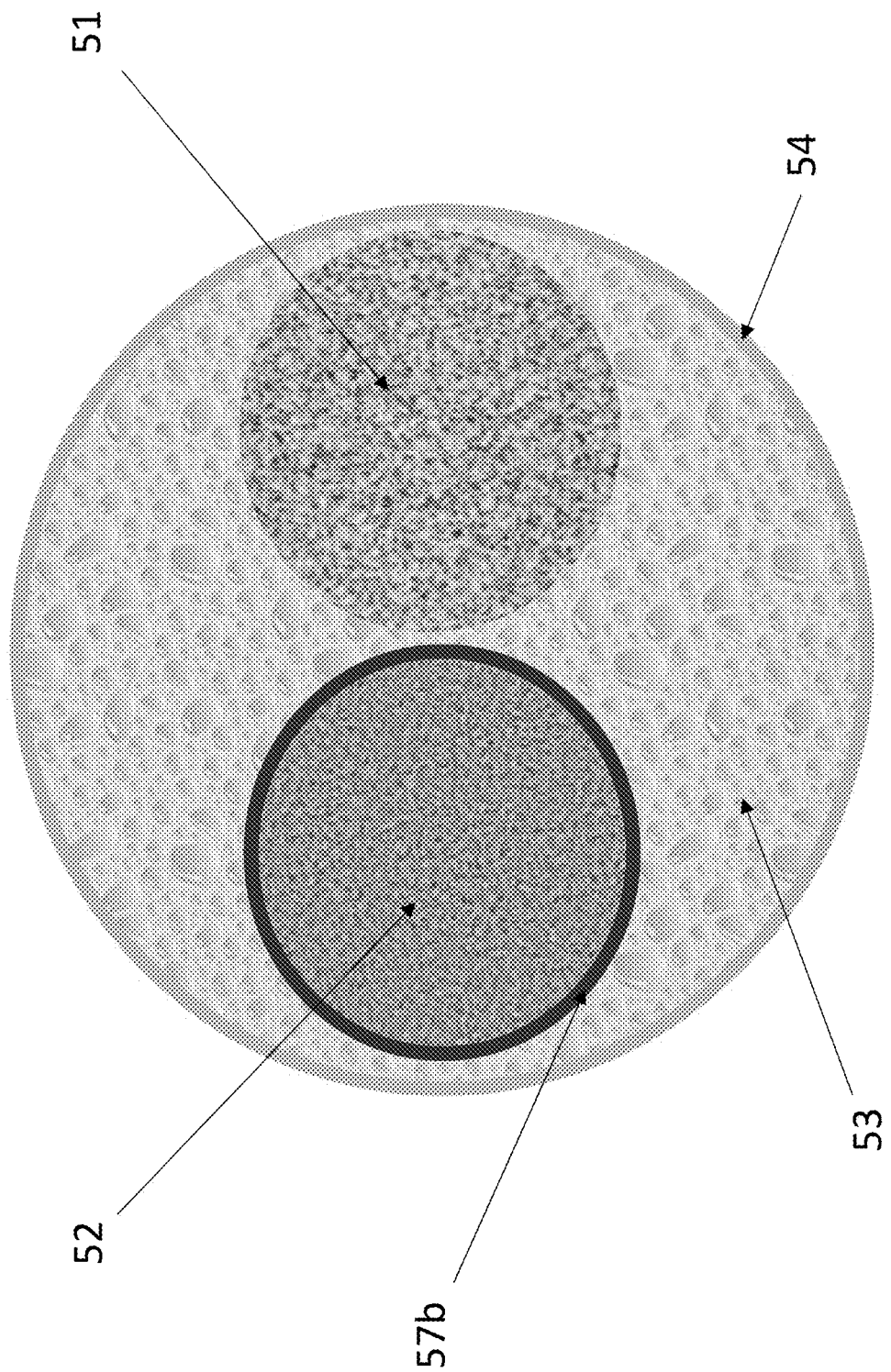
FIG. 5C shows an example cross-sectional schematic of an MCW according to some aspects of the present disclosure.

FIG. 5C shows another example cross-sectional schematic of an MCW according to aspects of the present disclosure. Similar to FIG. 5B, FIG. 5C shows a first electrode 51, a second electrode 52, and an insulator layer 54 substantially surrounding an electrolyte 53 (in this example, a liquid electrolyte), as described herein. In this example, only the second electrode 52 is surrounded by a separator membrane 57b as described herein. It should be understood that in some examples, only the first electrode 51 may be surrounded by a separator membrane (not shown in FIG. 5C).

Figure 5D:
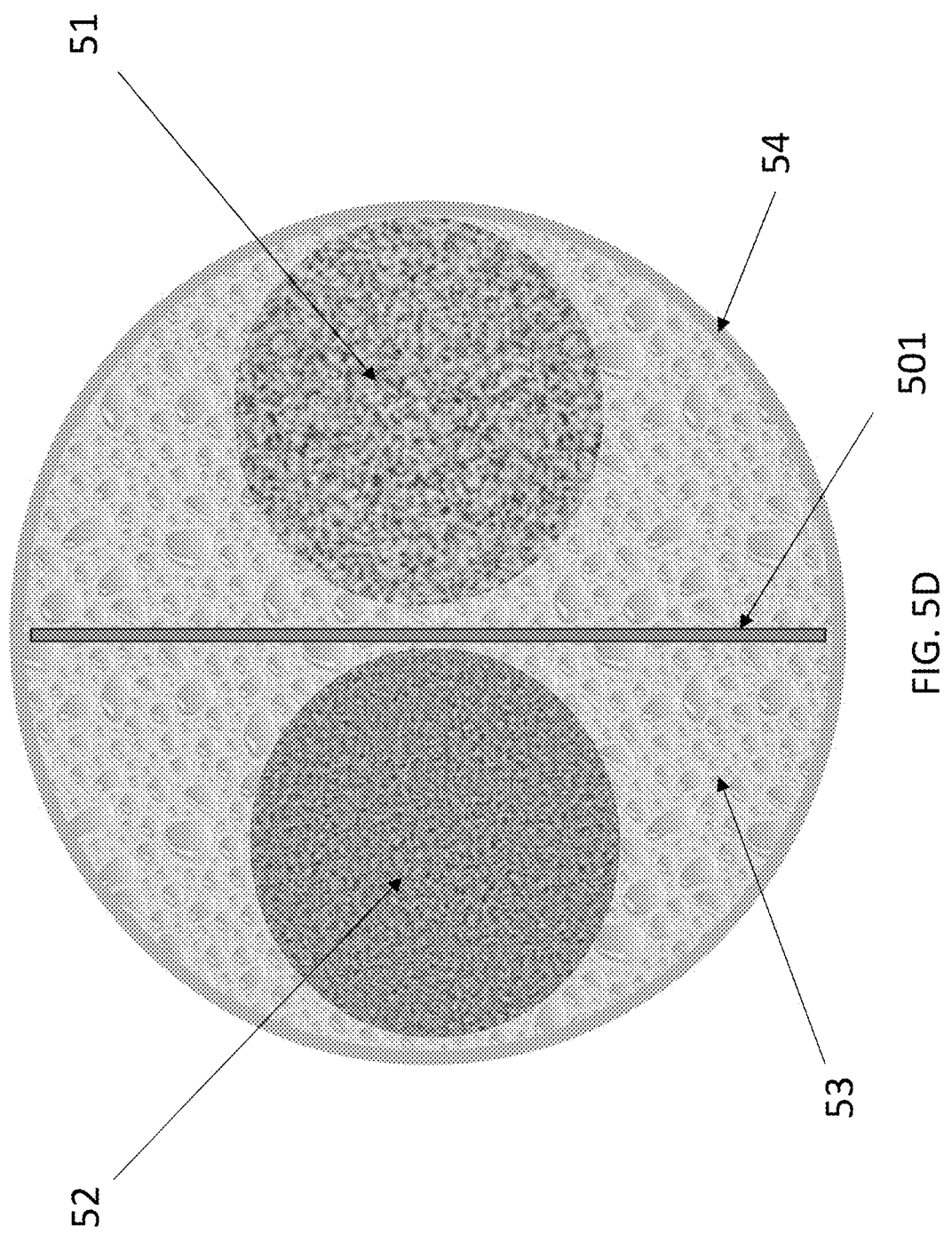
FIG. 5D shows an example cross-sectional schematic of an MCW according to some aspects of the present disclosure.

FIG. 5D shows another example cross-sectional schematic of an MCW according to aspects of the present disclosure. Similar to FIGS. 5B and 5C, FIG. 5D shows a first electrode 51, a second electrode 52, and an insulator layer 54 substantially surrounding an electrolyte 53 (in this example, a liquid electrolyte), as described herein. In this example, neither the first electrode 51 nor the second electrode 52 may be surrounded by a separator membrane 57. In this example, a distinct separator membrane 501 may be provided between the first electrode 51 and the second electrode 52.

Figure 5E:
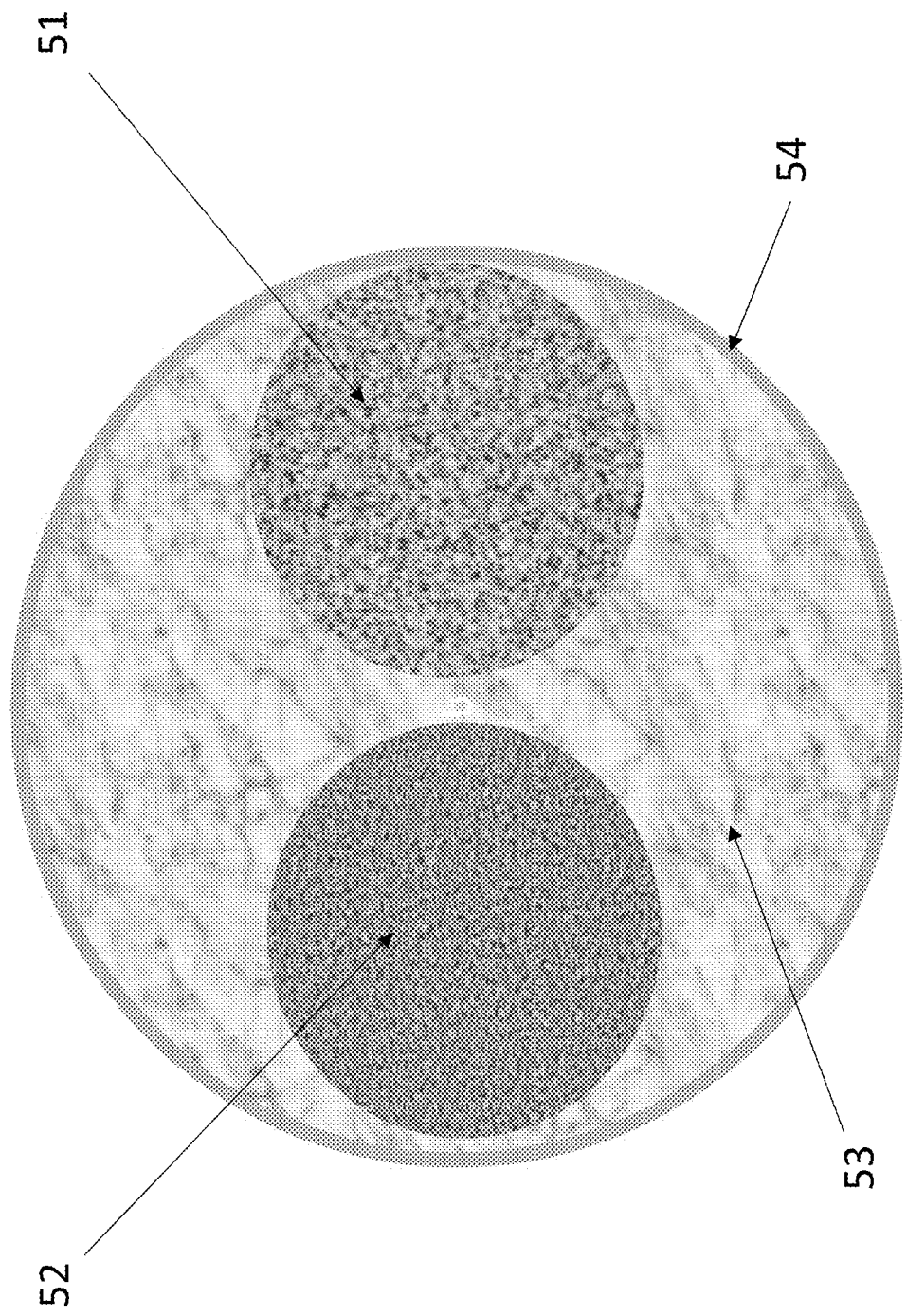
FIG. 5E shows an example cross-sectional schematic of an MCW according to some aspects of the present disclosure.

FIG. 5E shows another example cross-sectional schematic of an MCW according to aspects of the present disclosure. Similar to FIGS. 5B-5D, FIG. 5E shows a first electrode 51, a second electrode 52, and an insulator layer 54 substantially surrounding an electrolyte 53, as described herein. In this example, the electrolyte 53 may be a solid and/or a gel electrolyte, and as such, no separator membranes may be required.

Materials useful for the electrolyte include, but are not limited to, mixtures of alkyl carbonates (e.g., ethylene carbonate (EC), dimethyl (DMC), diethyl (DEC), and ethylmethyl carbonates (EMC)) and $LiPF_6$ as the electrolyte solution as well as gel and solid electrolytes.

Materials useful for the insulator layer include, but are not limited to, non-conductive materials such as polymer-based materials. Example non-conductive polymer-based materials include plastics such as polyethylene.

Materials useful for the conducting layer include, but are not limited to, materials capable of conducting AC current such as copper, nickel, aluminum, and alloys thereof. In one example, the conducting layer 55 comprises copper. It should be understood that the thickness of the conducting layer 55 may be selected based on the frequency of exploited AC current. According to some aspects, the thickness of the conducting layer may be between about 1 μm to about 10 mm. However, the thickness of the conducting layer is not limited. An insulator layer can be applied over the conducting layer, and further conducting layers can be applied over this insulator layer. For example, an electromagnetic shielding (or RF shielding) layer can be applied over the entire MCW, and this shielding layer can be covered with insulator.

It should be understood that the cable or MCW according to the present disclosure, for example, as shown in FIGS. 5A-5D, may function as both a conductor for AC (e.g., for use in an electrical vehicle motor) and a battery. In particular, at least the first electrode, the second electrode, and the electrolyte may together provide energy while the conducting layer may transmit electrical current. The MCW disclosed herein can be utilized for DC and, optionally, can switch from AC to DC, DC to AC, and can be utilized for any range of AC frequencies. In some embodiments, the one or more conductive layers can comprise insulated conductors, such that a conductive layer has multiple conductors therein. The MCW can have additional MCW in any layer surrounding the MCW.

As shown in FIG. 5A, the self-standing flexible electrodes can have one or more conductive battery tabs 58 which can provide an area for electrically connecting or for attaching the electrode to an external component or device. The conductive battery tabs can be utilized to connect an electrode to the conductive metal layer or current carrier layer of MCW. The conductive battery tabs can be attached to or embedded in the flexible self-standing electrodes by any means. The conductive battery tabs are not current collectors, for example, a metal substrate for the electrode prone to peeling and breaking. The self-standing flexible electrodes disclosed herein can be free of current collector and free of binder. In some embodiments, the battery tab can comprise a different material at or near the area of attachment to the flexible self-standing electrode and a different material external to the MCW or extending from the MCW.

Battery tabs can be attached to the electrodes, in accordance with aspects of the present disclosure, either to protrusions extending from the main body of the respective electrode and not overlapping with the other electrode; or to the main body of the respective electrode at cutouts of a separator membrane and the opposing electrode. According to some aspects, battery tabs are embedded into the electrodes. Suitable battery tab materials and methods of attachment include those known to persons of ordinary skill in the art. In some embodiments, the conductive battery tabs can comprise copper or lead for the anode. In some embodiments, the conductive battery tabs can comprise aluminum or lead for the cathode. According to some aspects, the battery tabs can comprise one metal at or near attachment to the electrode and a different metal extending away from the electrode, for example, a stretchable and flexible spring metal as a stretchable and flexible battery tab attachment. According to some aspects, flexible or inflexible battery tab attachments 59 are attached to the conductive battery tabs. The battery tab attachments 59 can be attached to the battery tabs 58 by any means known in the art, for example, soldering, welding, pressing, or interlocking components. The battery tab attachments 59 can be used to connect the electrodes to any external component, article, or device. The battery tabs 58 or battery tab attachments 59 can be used to connect the electrodes to one or more conductive layers or current carriers in the MCW. For example, the battery tabs or battery tab attachments can be connected to a component utilized to convert DC to AC and further connected to a conductive layer. The battery tabs 58 or battery tab attachments 59 can be located at one or more exposed ends of MCW or can be located along any position along the MCW. In some embodiments, a length of MCW can comprise multiple battery tabs 58 or battery tab attachments 59.

Any device or article can incorporate the MCW as described herein, including, for example, an electrical vehicle motor. It should be understood that conventional electrical vehicle motors, such as the electrical motor 61 shown in FIG. 6A, generally require external batteries 62A and 62B to create torque via induced electromagnetic fields. As shown in FIG. 6A, such electrical motors can generally comprise copper coils 63, which transmit electrical current that generates a magnetic field and/or which accumulate electrical current induced by an external magnetic field.

FIG. 6B shows one illustrative aspect of the present disclosure, specifically an electrical vehicle motor 601. As shown in FIG. 6B, an electrical vehicle motor 601 may include one or more MCW coils 602 in place of one or more of the copper coils 63 generally provided in conventional electrical vehicle motors (as shown, for example, in FIG. 6A). The one or more MCW coils 602 may comprise a MCW coil having a configuration as described, for example, in relation to FIG. 5A. In particular, the MCW coil may comprise two electrodes 603 in a twisted configuration, an electrolyte 604, an insulator layer 605, a conducting layer 606, and a battery tab attachment 59 as described in relation to FIG. 5A. According to some aspects, the MCW coils 601 may be configured to both transmit electrical current and partially or completely power the electrical vehicle motor 601, thereby reducing or eliminating the need for an external battery (for example, external batteries 62A and 62B shown in FIG. 6A). The electrical motor 61 shown in FIG. 6B can represent a solenoid, a generator, an alternator, and a transformer, any of which comprise MCW according to various aspects of the present disclosure.

The present disclosure is also directed to methods of using the carbon nanotube composite yarns prepared according to the methods described herein. For example, a method may comprise preparing an article or device as described herein comprising the carbon nanotube composite yarns. For example, the method may comprise weaving the carbon nanotube composite yarns to provide an E-textile. The method may comprise preparing a MCW or cable as described herein. For example, the method may comprise providing a first electrode (e.g., an anode) and a second electrode (e.g., a cathode) in an optional twisted configuration and separated by one or more separator membranes and/or an electrolyte, wherein each of the first and second electrodes individually comprises a carbon nanotube composite yarn as disclosed herein. The method may further comprise providing an electrolyte surrounding the first and second electrodes, providing an insulator layer surrounding the electrolyte, and/or providing a conducting layer surrounding the insulator layer.

According to some aspects, a method of making MCW can comprise providing a first flexible electrode comprising a first carbon nanotube composite yarn containing carbon nanotubes and a first secondary material (e.g., first secondary particles); providing a second flexible electrode comprising a second carbon nanotube composite yarn containing carbon nanotubes and a second secondary material (e.g., second secondary particles); optionally surrounding the first flexible electrode with a first separator membrane; optionally surrounding the second flexible electrode with a second separator membrane; surrounding the first and second flexible electrodes with an electrolyte; surrounding the electrolyte with a flexible insulator layer; and at least partially surrounding the flexible insulator layer with a flexible conducting layer.

It should be understood that the steps as described herein are not limited to one order. For example, in the case of a liquid electrolyte, the method of making the MCW may comprise providing a first flexible electrode and a second flexible electrode in a configuration as described herein (e.g., in a parallel, quasi-parallel, or twisted configuration), wherein one or both of the first flexible electrode and the second flexible electrode are provided with a first separator membrane and a second separator membrane, respectively, and/or a distinct separator membrane is provided between the first flexible electrode and the second flexible electrode, as described herein. The method may further comprise providing the first and second flexible electrodes in an insulator layer as described herein and subsequently surrounding the first and second flexible electrodes with an electrolyte as describe herein. In this example, a flexible conducting layer may be provided before, during, or after any step as described herein.

In another example, in the case of a solid or gel electrolyte, the method of making the MCW may comprise providing the electrolyte in communication with (e.g., on a surface of and/or immersed in) a first flexible electrode and a second flexible electrode, wherein the first flexible electrode and/or the second flexible electrode are independently provided with or without a first separator membrane and/or a second separator membrane, respectively. It should be understood that the first separator membrane and/or the second separator membrane may independently be provided before, during, and/or after the electrolyte is provided, or the first separator membrane and/or the second separator membrane may be excluded. The method may further comprise subsequently providing the first electrode and the second electrode in a configuration as described herein (e.g., in a parallel, quasi-parallel, or twisted configuration). In this example, the first and second electrodes may be provided in an insulator layer before, during, or after they are provided in their final configuration. Furthermore, in this example, a flexible conducting layer may be provided before, during, or after any step as described herein.

According to some aspects, providing a flexible conducting layer as described herein may be performed via any technique useful according to the present disclosure. For example, the flexible conducting layer may be provided using an electrodeposition technique, an electroplating technique, or a combination thereof. In one non-limiting example, the flexible conducting layer may be provided via an electroplating technique that comprises providing an electric current which causes dissolved metal ions to adhere to a surface, for example, the surface of an insulator layer as described herein. In another non-limiting example, the flexible conducting layer may be provided as a pre-formed structure (e.g., a pre-formed elongated hollow body, such as a tube) in which a first flexible electrode, a second flexible electrode, a first separator membrane, a second separator membrane, an electrolyte, and/or a flexible insulator layer may be provided as described herein.

Methods to assemble an article or device comprising multifunctional conductive wire (MCW) are disclosed herein. For example, attaching MCW to one or more electrical components can assemble an article or device comprising MCW. Winding MCW into a coil, optionally a metal core coil, and attaching the coil to a component can assemble a device or article comprising MCW. In some embodiments, a device or an article having MCW can be assembled by attaching MCW, as a current carrier and a source of power and/or power storage for a component of a device or an article.

According to some aspects, a MCW can comprise a first flexible electrode comprising a first carbon nanotube composite yarn containing carbon nanotubes and secondary particles; a second flexible electrode comprising a second carbon nanotube composite yarn containing carbon nanotubes and secondary particles; a first separator membrane surrounding the first flexible electrode; a second separator membrane surrounding the second flexible electrode; an electrolyte surrounding the first and second flexible electrodes; a flexible insulator layer surrounding the electrolyte; and a flexible conducting layer at least partially surrounding the flexible insulator layer.

This detailed description uses examples to present the disclosure, including the preferred aspects and variations, and to enable any person skilled in the art to practice the disclosed aspects, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as an "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

What is claimed is:

1. A multifunctional conductive wire comprising:
an elongated hollow body comprising a conductive material;
a first electrode positioned in the hollow body comprising a first carbon nanotube composite yarn comprising carbon nanotubes and a first secondary material; and
a second electrode positioned in the hollow body comprising a second carbon nanotube composite yarn comprising carbon nanotubes and a second secondary material.

2. The multifunctional conductive wire of claim 1, further comprising an electrolyte surrounding the first and second electrodes.

3. The multifunctional conductive wire of claim 2, further comprising a flexible insulator layer surrounding the electrolyte, wherein the conductive material comprises a flexible conducting layer at least partially surrounding the flexible insulator layer.

4. The multifunctional conductive wire of claim 3, further comprising an outer flexible insulator layer surrounding the flexible conducting layer.

5. The multifunctional conductive wire of claim 1, further comprising:
one or more conductive battery tabs attached to the first electrode and/or the second electrode, and
one or more respective battery tab attachments attached to the one or more conductive battery tabs.

6. The multifunctional conductive wire of claim 1, wherein at least one of the first electrode and the second electrode is surrounded by a separator membrane, and wherein the first electrode and the second electrode are wrapped around each other in a twisted configuration.

7. The multifunctional conductive wire of claim 1, further comprising a distinct separator membrane between the first electrode and the second electrode.

8. The multifunctional conductive wire of claim 3, wherein the flexible conducting layer has a thickness of about 1 micrometer to about 10 millimeters.

9. The multifunctional conductive wire of claim 1, wherein the multifunctional conductive wire has a square outer shape or a rectangular outer shape.

10. The multifunctional conductive wire of claim 3, wherein the flexible conducting layer comprises copper.

11. The multifunctional conductive wire of claim 2, wherein the electrolyte comprises ethylene carbonate, dimethyl carbonate, diethyl carbonate, ethyl-methyl carbonates, or a combination thereof.

12. The multifunctional conductive wire of claim 1, wherein:
at least a portion of the first secondary material is provided as particles;
at least a portion of the second secondary material is provided as particles; and
the first secondary material is different from the second secondary material.

13. The multifunctional conductive wire of claim 1, wherein the first electrode is an anode and the second electrode is a cathode.

14. The multifunctional conductive wire of claim 13, wherein:
the first secondary material comprises graphite flakes, and
the second secondary material comprises Li(Ni,Mn,Co)O2, (LiNixMnyCozO2, x+y+z=1), or a combination thereof.

15. A method of making a multifunctional conductive wire, the method comprising:
providing a first electrode at least partially surrounded by a flexible conducting layer, wherein the first electrode comprises a first carbon nanotube composite yarn comprising carbon nanotubes and a first secondary material; and
providing a second electrode at least partially surrounded by the flexible conducting layer, wherein the second electrode comprises a second carbon nanotube composite yarn comprising carbon nanotubes and a second secondary material.

16. The method of claim 15, further comprising:
surrounding the first and second electrodes with an electrolyte;
surrounding the electrolyte with a flexible insulator layer; and
at least partially surrounding the flexible insulator layer with the flexible conducting layer.

17. The method of claim 16, further comprising surrounding the flexible conducting layer with an outer flexible insulator layer.

18. The method of claim 17, further comprising:
attaching one or more conductive battery tabs to the first electrode and/or the second electrode; and
attaching one or more respective battery tab attachments to one or more of the conductive battery tabs.

19. The method of claim 15, further comprising:
surrounding at least one of the first electrode and the second electrode by a separator membrane; and
wrapping the first electrode and the second electrode are around each other in a twisted configuration.

20. The method of claim 18, wherein providing the first electrode comprises:
growing floating carbon nanotubes in a reactor;
removing the floating carbon nanotubes from the reactor to provide a mat of carbon nanotubes;
depositing secondary particles comprising the first secondary material on at least a portion of the mat of carbon nanotubes to provide a carbon nanotube composite mat; and
densifying the carbon nanotube composite mat to provide the first carbon nanotube composite yarn.

* * * * *